INVENTOR
HANS CHRISTIAN HANSEN

BY Dicke & Craig
ATTORNEYS

INVENTOR
HANS CHRISTIAN HANSEN

BY Dicke + Craig
ATTORNEYS

INVENTOR
HANS CHRISTIAN HANSEN

BY Dicke + Craig
ATTORNEYS

INVENTOR
HANS CHRISTIAN HANSEN

BY Dicke & Craig
ATTORNEYS

June 21, 1966 H. C. HANSEN 3,257,114

PHONOGRAPH RECORD CHANGERS

Filed Aug. 27, 1962 10 Sheets-Sheet 5

INVENTOR
HANS CHRISTIAN HANSEN

BY Dicke + Craig

ATTORNEYS

June 21, 1966 H. C. HANSEN 3,257,114

PHONOGRAPH RECORD CHANGERS

Filed Aug. 27, 1962 10 Sheets-Sheet 6

INVENTOR
HANS CHRISTIAN HANSEN

BY Dicke & Craig
ATTORNEYS

INVENTOR
HANS CHRISTIAN HANSEN

BY Dicke + Craig
ATTORNEYS

INVENTOR
HANS CHRISTIAN HANSEN

BY Dicke + Craig
ATTORNEYS

June 21, 1966 H. C. HANSEN 3,257,114

PHONOGRAPH RECORD CHANGERS

Filed Aug. 27, 1962 10 Sheets-Sheet 9

INVENTOR

HANS CHRISTIAN HANSEN

BY Dicke & Craig

ATTORNEYS

June 21, 1966 H. C. HANSEN 3,257,114

PHONOGRAPH RECORD CHANGERS

Filed Aug. 27, 1962 10 Sheets-Sheet 10

INVENTOR

HANS CHRISTIAN HANSEN

BY Dicke + Craig

ATTORNEYS

United States Patent Office 3,257,114

Patented June 21, 1966

3,257,114
PHONOGRAPH RECORD CHANGERS

Hans Christian Hansen, 14 Christiansholmsvej, Klampenborg, Copenhagen, Denmark

Filed Aug. 27, 1962, Ser. No. 219,630
Claims priority, application Great Britain, Aug. 31, 1961, 31,382/61
23 Claims. (Cl. 274—10)

The present invention relates to phonograph record changers having a record supporting and releasing spindle.

It is a main purpose of the invention to provide a record changing phonograph of the type referred to which will operate safely to release only the lowest record of a stack supported on the spindle.

It is a further purpose of the invention to provide a phonograph of the type referred to in which individual control is provided for primary and secondary supporting means of the spindle.

It is a further purpose of the invention to provide a record changing phonograph having a record supporting and releasing spindle which is less critical with respect to tolerances in production and mounting of the parts.

Still a further purpose of the invention is to provide a record changing phonograph having a record supporting and releasing spindle with primary and secondary supporting means in which it can be ensured that the secondary supporting means has been rendered effective before the primary supporting means is activated.

Still a further purpose of the invention is to provide a record changing phonograph having a record supporting and releasing spindle with primary supporting means in the form of prongs which can be tilted between an inclined record supporting position and a retracted record releasing position and with secondary supporting means can be operated automatically, using the phonograph as a record changer to render the secondary supporting means effective and thereafter the primary supporting means ineffective and vice versa, and in which for the purpose of using the phonograph as a single player the primary supporting prongs only can be retracted without rendering the secondary supporting means effective so as to enable a record to slip down along the centre spindle and be deposited directly on the turntable of the phonograph.

Figure 1:
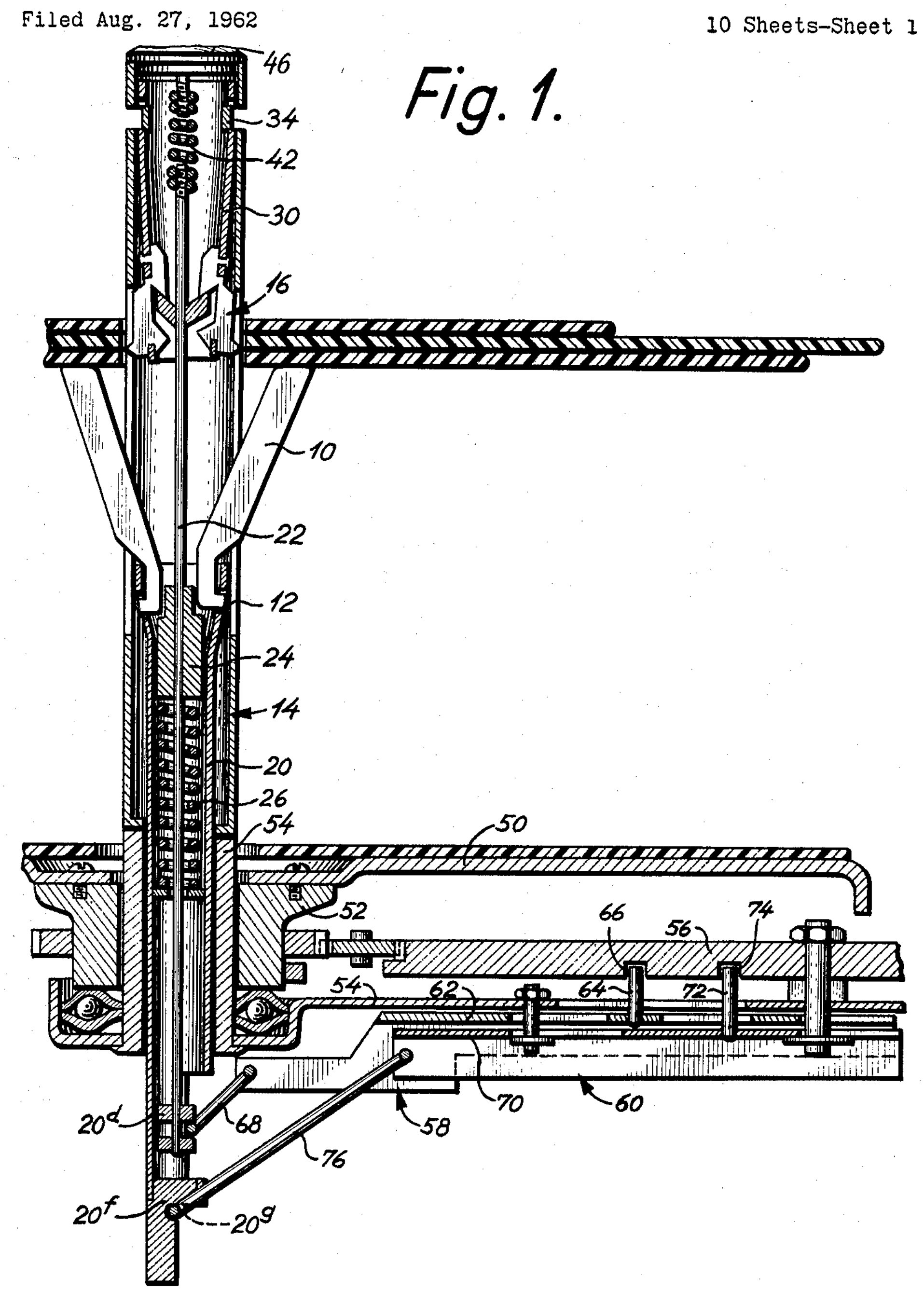
Figures 2, 3:
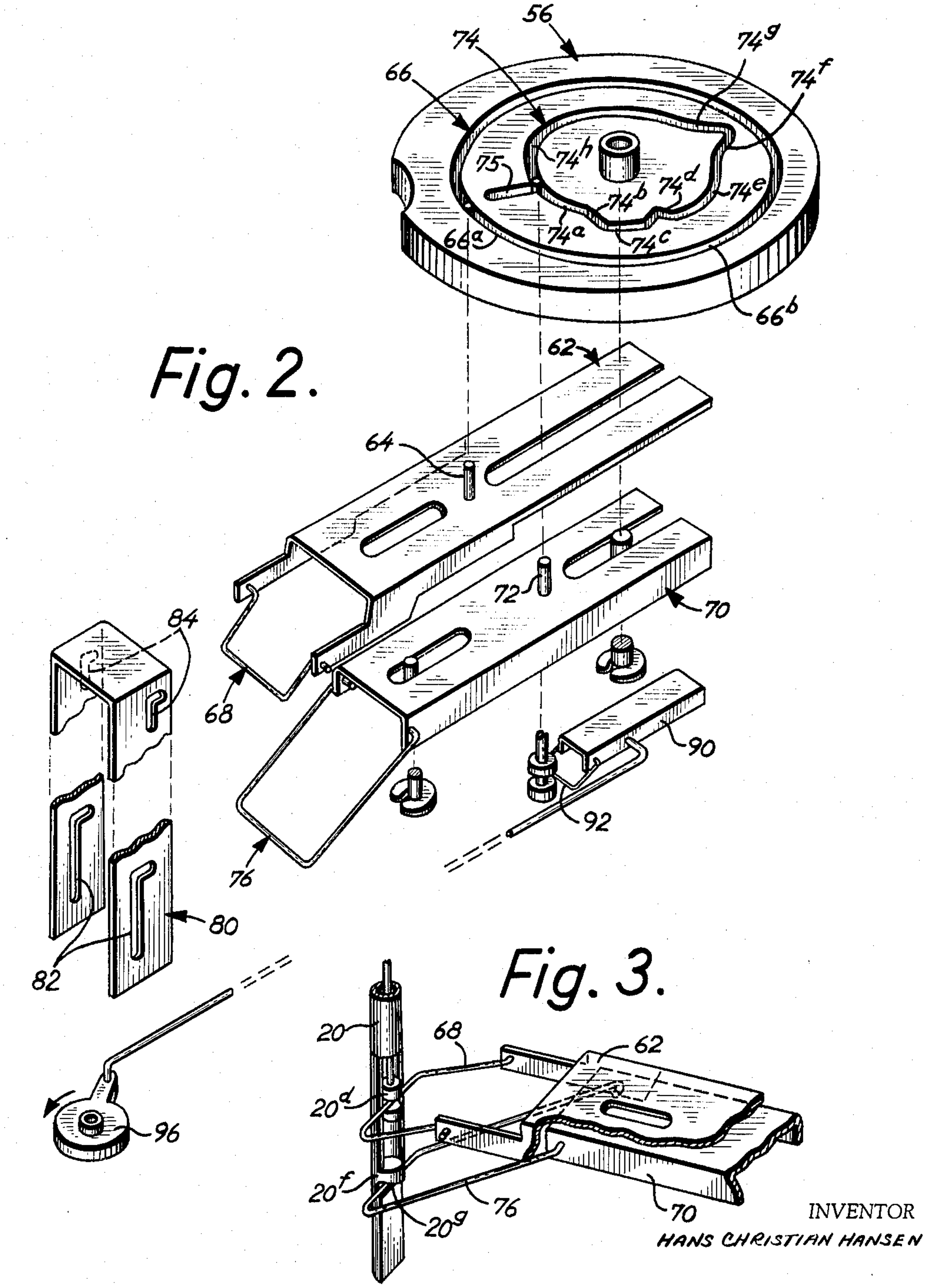
Figure 4:
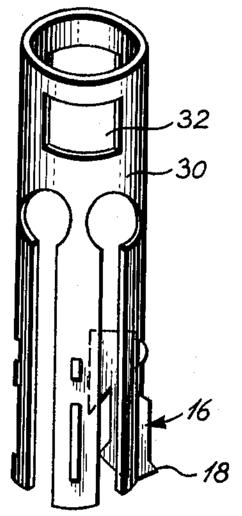
Figure 5:
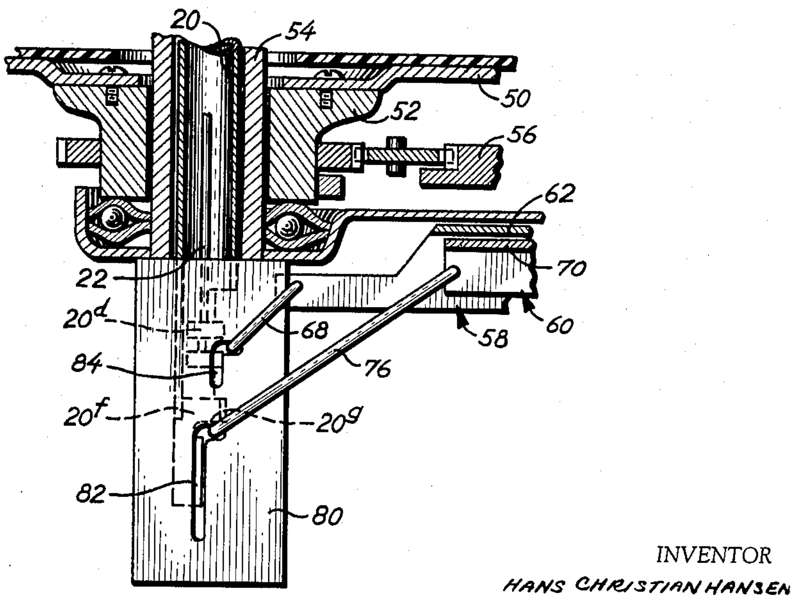
Figure 6:
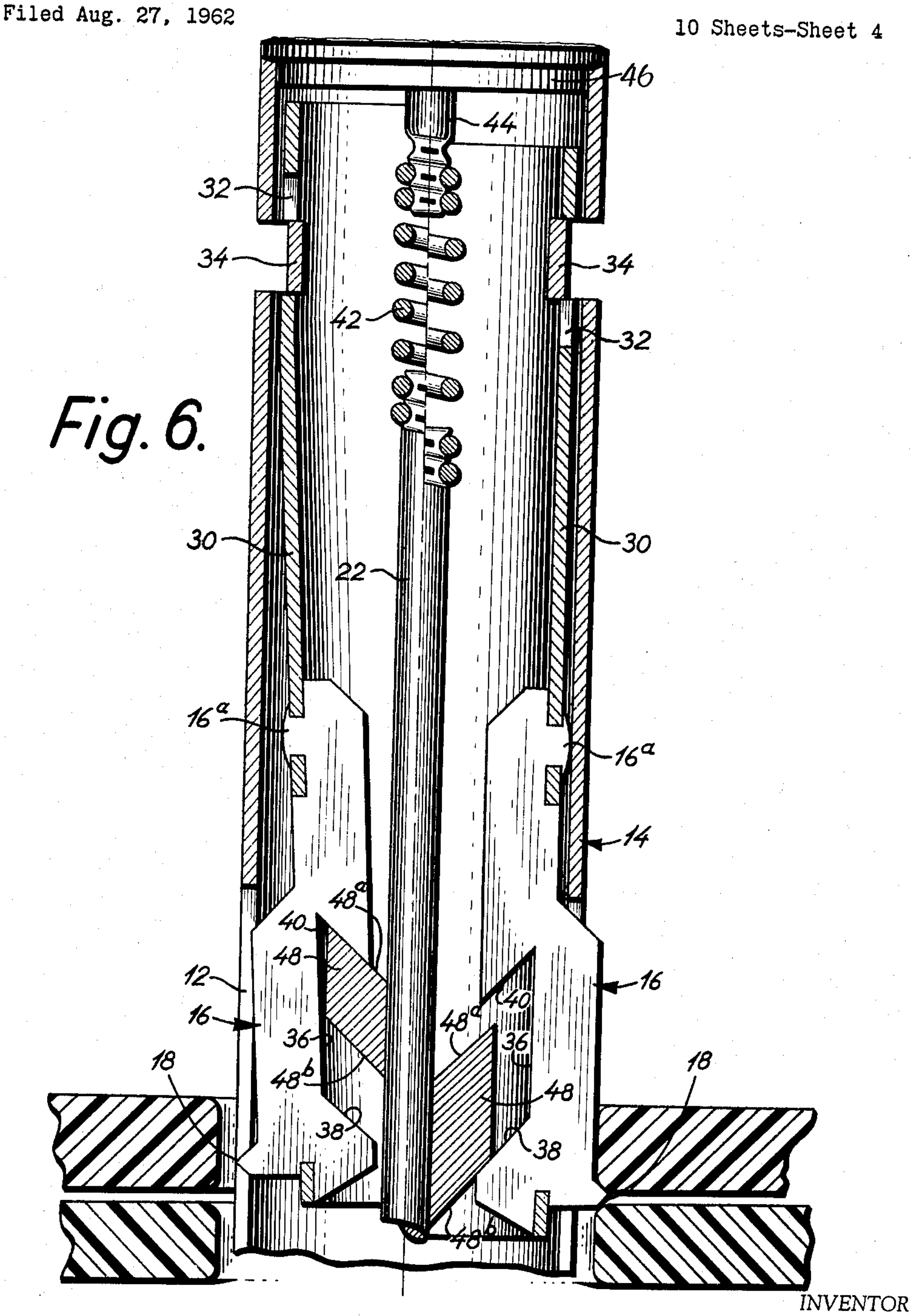
Figure 7:
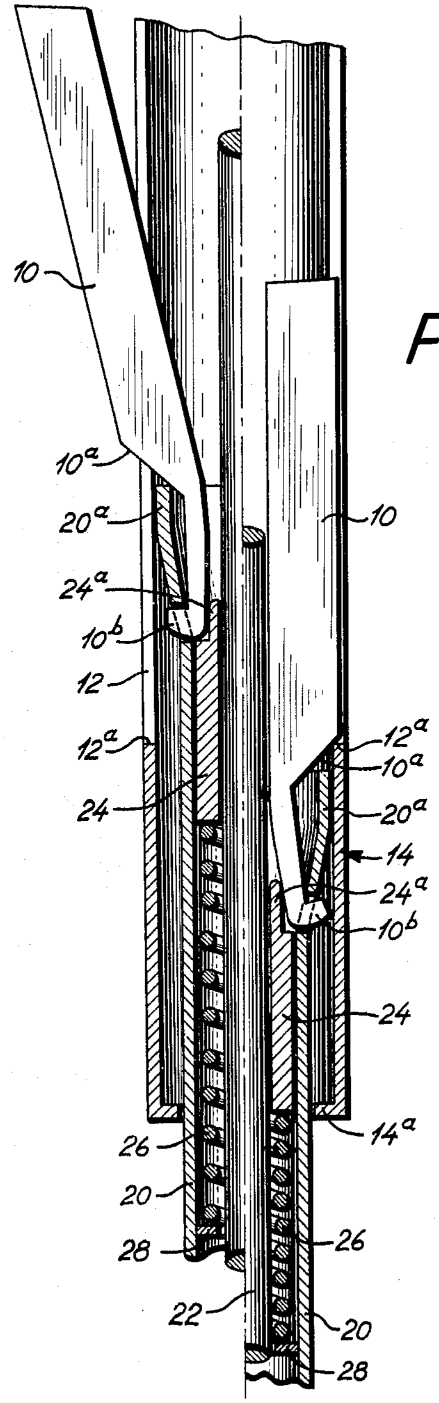
Figure 8:
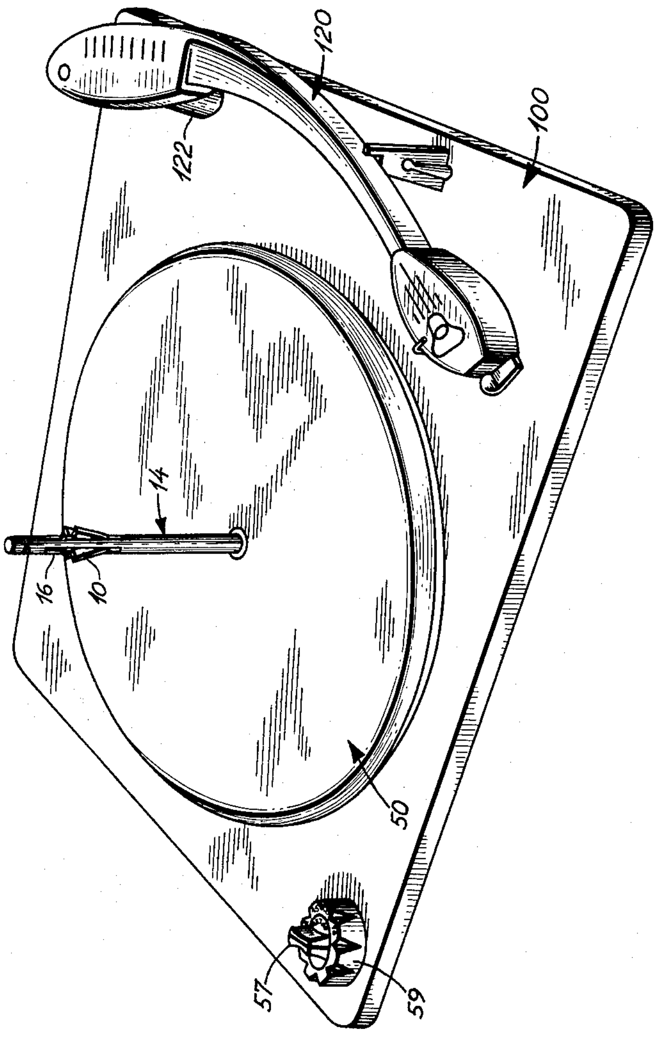
Figure 9:
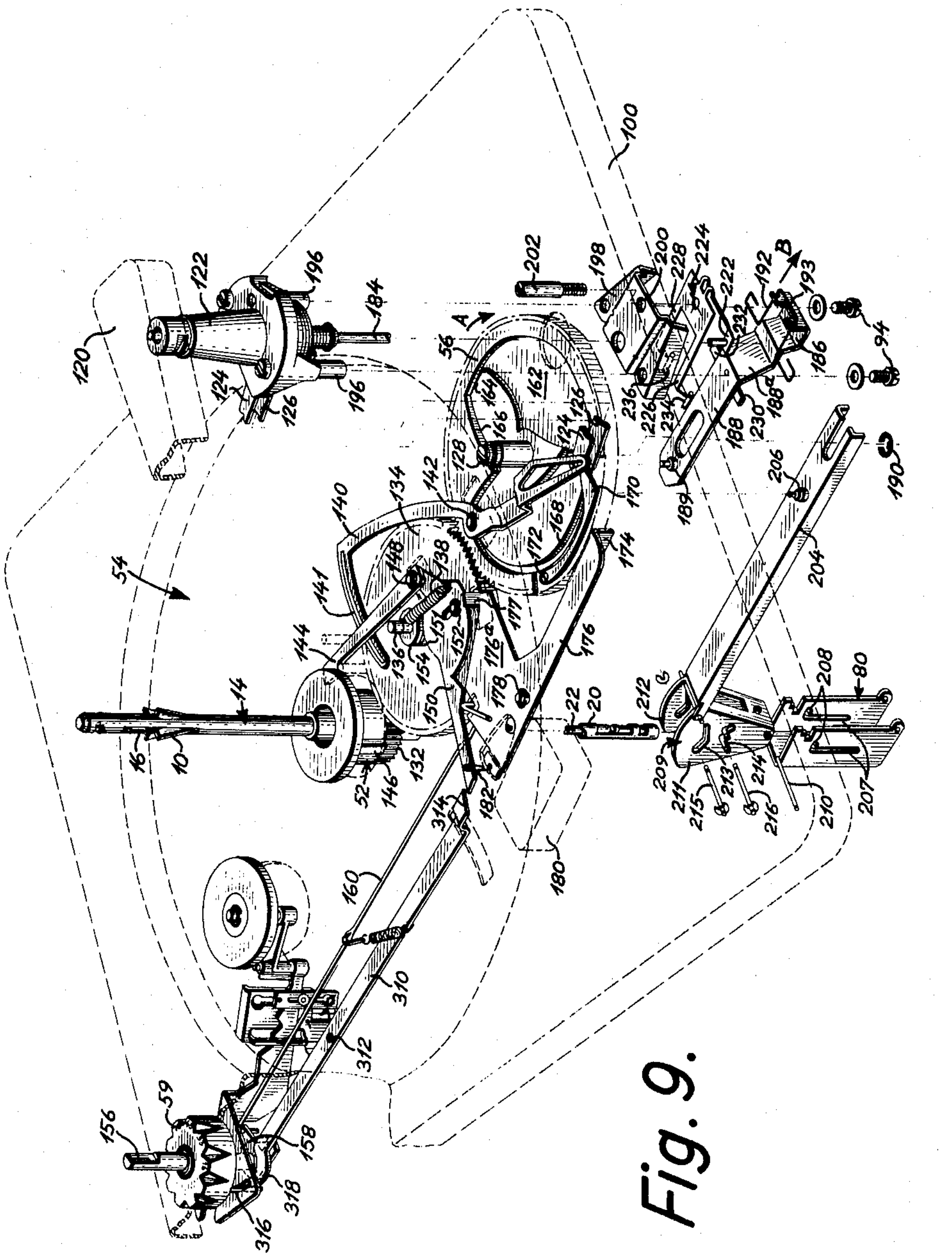
Figure 10:
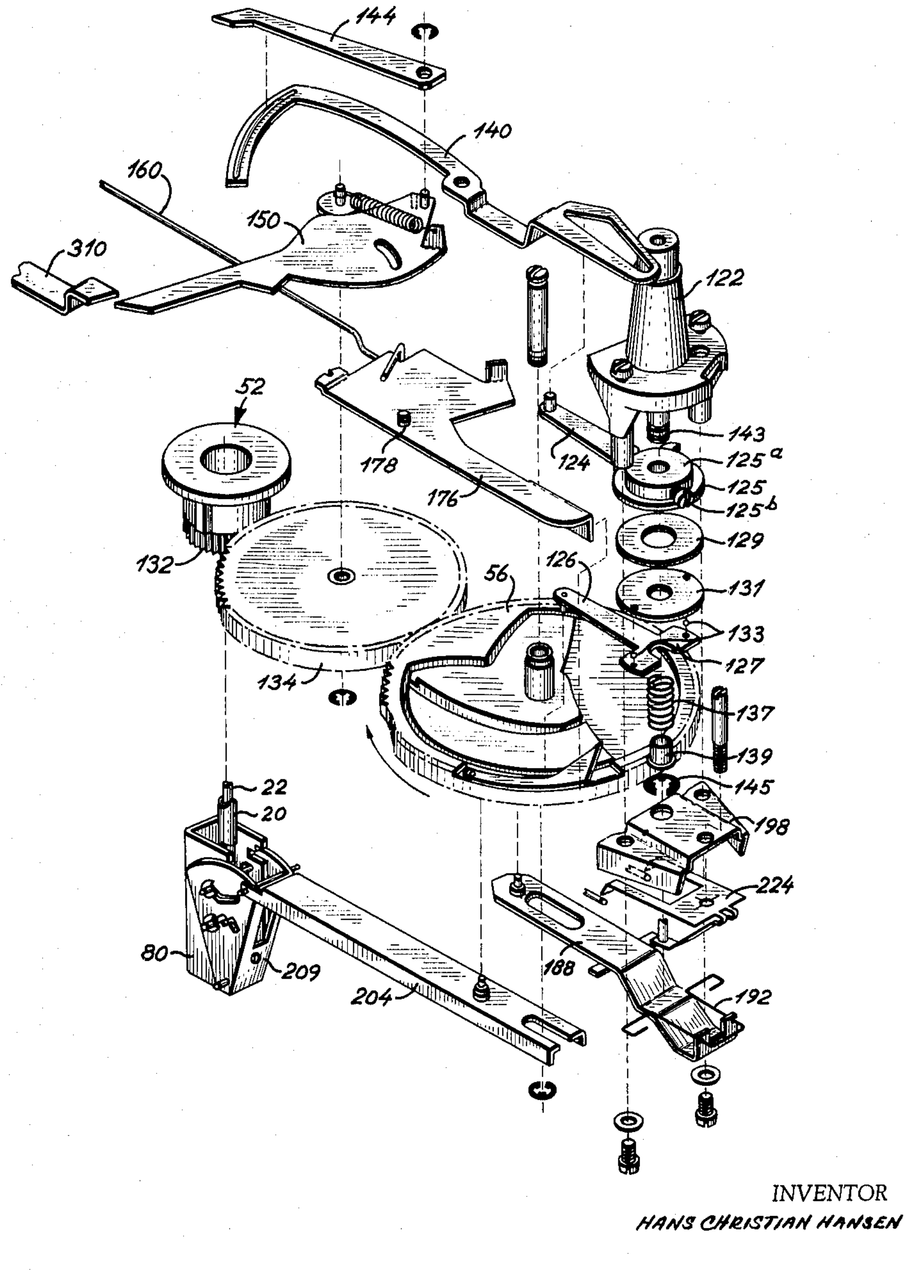
Figures 11, 12:
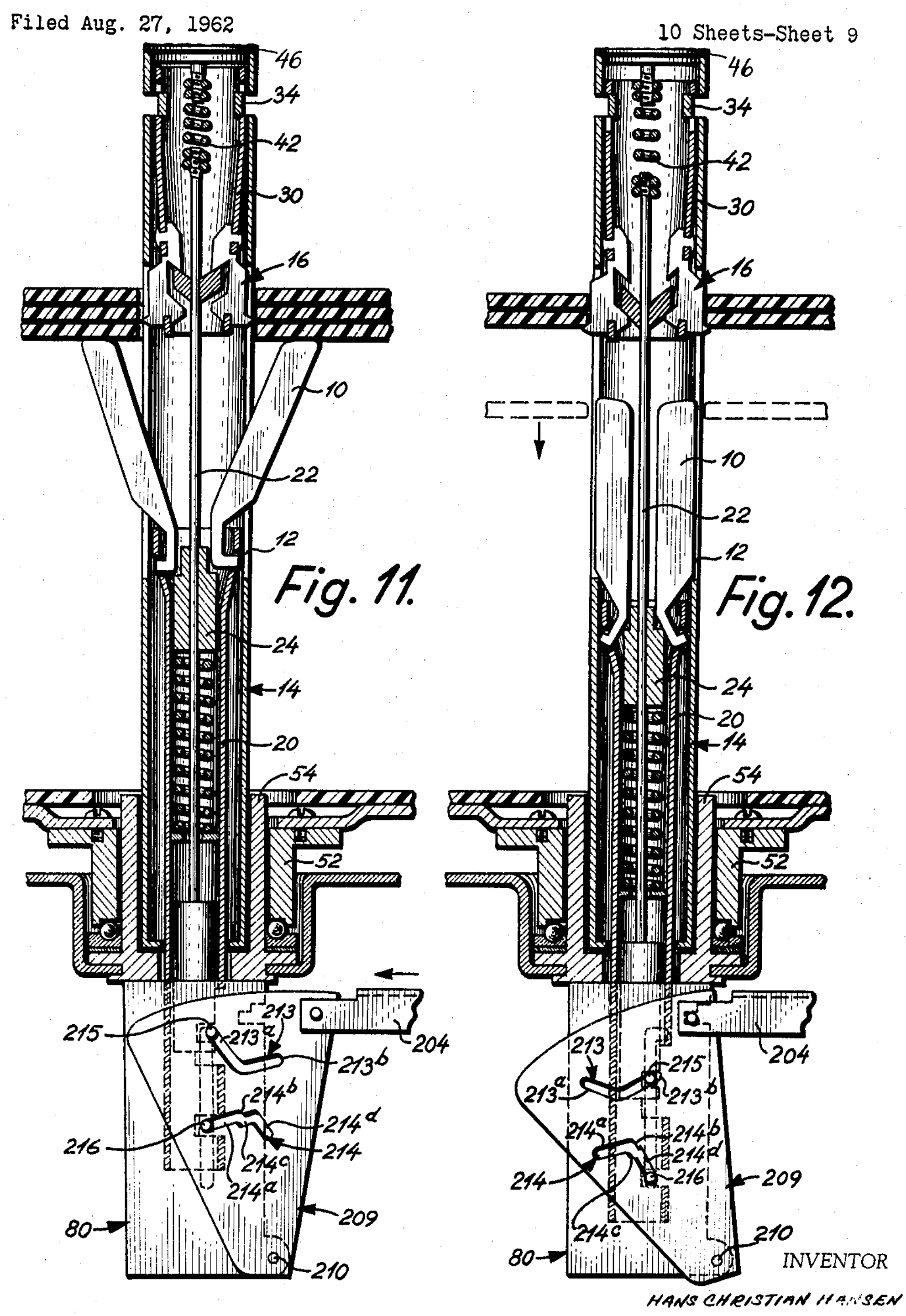
Figure 13:
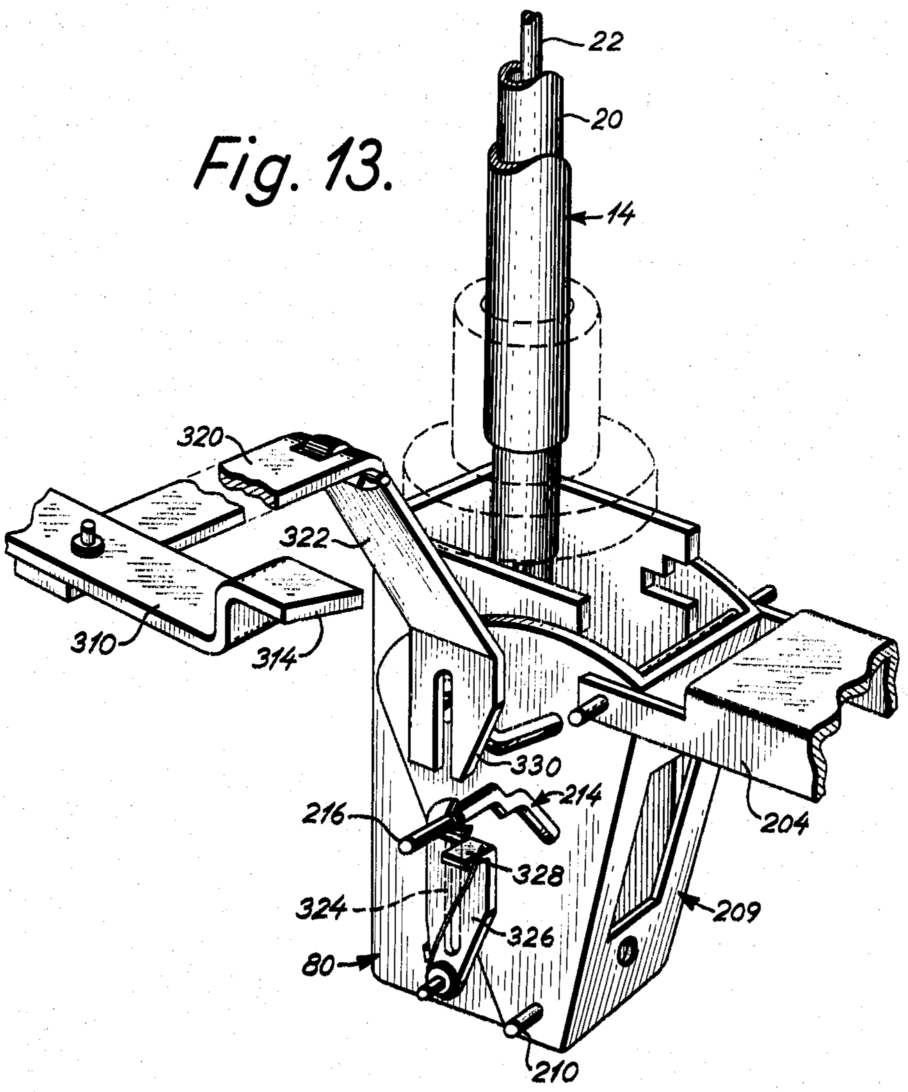

Further purposes and advantages of the invention will appear from the following specification with reference to the accompanying drawing, in which:

FIG. 1 is a longitudinal section through a spindle according to the invention including the essential parts of a phonograph necessary for understanding the invention, FIG. 2 is an exploded perspective view of an embodiment of the phonograph control mechanism for operating the spindle, FIG. 3 is a perspective view of a part of the mechanism shown in FIG. 2, also illustrating the lower end of the spindle, FIG. 4 is a perspective view of a detail of the spindle illustrating the secondary supporting members of the spindle, FIG. 5 is a side, view, partly in section, of the phonograph control mechanism, FIG. 6 is a longitudinal section through the upper end of the spindle in enlarged scale, FIG. 7 is a longitudinal section through the middle portion of the spindle, also in enlarged scale, FIG. 8 is a general perspective view of a phonograph according to the invention, FIG. 9 is a perspective, partly exploded, view of the mechanism of the phonograph shown in FIG. 8, FIG. 10 is an exploded view of a part of the mechanism shown in FIG. 9, FIG. 11 is a longitudinal section through the centre spindle and a part of the control mechanism in the record supporting position of the parts of the centre spindle, FIG. 12 is a section as shown in FIG. 11 with the parts of the centre spindle in the record releasing position, and FIG. 13 is a perspective view showing some of the parts of the phonograph illustrated in FIG. 9 in a modified embodiment.

In broad terms the invention provides a record changing phonograph having a vertical hollow central guiding and supporting spindle generally referred to by 14 operable to support a stack of records and having a plurality of elongated slots 12 in which a plurality of primary supporting prongs 10 are tiltable between a projecting inclined position operable to support a stack of records on their top ends and a retracted position allowing a record to descend along the pin to a turntable 50.

The spindle further includes secondary supporting means generally referred to by 16 for temporarily holding the next to the lowest record of a stack supported on the prong ends.

The spindle includes a first reciprocable control means 20 operatively connected with the prongs 10 and operable to exclusively control the tilting of the prongs, and a second reciprocable control member 22 operatively connected with the secondary supporting means for exclusively activating and inactivating the secondary supporting means.

Eventually the phonograph includes cycle responsive means to be more fully described in the following to control the desired timed relationship between the operation of the prongs 10 and the secondary supporting means 16 so as to render the secondary supporting means 16 effective before the prongs are retracted to the record releasing position and to render the prongs effective to support the stack of records before the secondary supporting means 16 is released.

More specifically with reference to FIGURES 1, 4, and 6 a record supporting and releasing spindle is illustrated having primary supporting means 10 as exemplified by tiltable prongs movable in slots 12 in an exterior tubular member 14 operable to support a stack of records and to release a record in response to retraction within the spindle tube 14. The spindle further comprises secondary supporting means 16 as exemplified by knife or wedge members 18 operable to support the next lowest and other records, if any, of the stack supported on the prongs 10 during the release of the lowest record by said primary supports.

For the purpose of operating the primary as well as the secondary supporting means, first elongated control means as exemplified by a tubular member 20 for the primary supporting means 10 is mounted for reciprocation within the spindle. Said first control means 20 is operable only to render the primary supporting means 10 effective to support the stack of records in response to reciprocation in one direction, and to release a record in response to reciprocation in the other direction. Within the spindle second elongated control means, as exemplified by a rod 22, is provided for reciprocation within the spindle and being operable only to render the secondary supporting means 16 effective to support the next lowest record, if any, of the stack in response to reciprocation in one direction, and being operable to render said secondary supporting means 16 ineffective in response to the reciprocation of said second elongated control means 22 in the other direction.

In more detail the primary supporting prongs 10 are as shown in FIGS. 1 and 7 provided with outwardly facing inclined cam surfaces 10*a* operable to engage the lower ends 12*a* of the slots 12 in the exterior tubular member 14 so as to control retraction of the prongs to within the spindle in response to reciprocation of the elongated control means 20 in downward direction. The control means 20 is in the form of an elongated tube which adjacent the top end 20*a* is widened to an exterior diameter which substantially corresponds to the interior diameter of the exterior tube 14. Apertures are provided in the tubular member 20 for engagement with hook-like extensions 10*b* adjacent the lower end of the prongs 10. Adjacent the lower end of the tubular member 14 the tubular member 20 is guided by means of an inwardly extending collar 14*a* integral with the tube 14. A sleeve 24 is mounted for reciprocation within the tubular member 20 and is reciprocable against resilient action by means of a spring 26, the lower end of which engages a spring, washer or the like 28 secured inside the tubular member 20. The reciprocation of the tubular member 20 in upward direction is limited by suitable abutment means inside the exterior tube, for example in the form of flaps stamped out of the material of the tubular member 14 between the slots 12, and bent slightly inwards. Adjacent the top end the sleeve 24 is provided with a portion 24*a* of reduced diameter operable to engage the inwardly facing edges of the prongs 10 so as to tilt them to the extended position shown in FIGURE 1 and at the left hand side of FIG. 7, the right hand side of which shows a prong in the retracted position.

The secondary supporting structure comprises, as shown in FIGURES 1, 4, and 6 a slotted tubular member 30 mounted for reciprocation in the top end of the exterior tubular member 14. The tubular member 30 is of suitable spring material in which the slots shown in FIG. 4 may be provided by stamping. In the fingers between the slots elongated apertures are stamped for receiving and holding the secondary supporting members 16 which are safely held in position in the manner clearly shown in the section of FIG. 6 and riveted at 16*a*. Adjacent the top end the tubular structure 30 is provided with a pair of oppositely arranged apertures, one of which is shown at 32 in FIG. 4. At opposite sides of the exterior tubular member 14 a part of the wall is pressed into these apertures as indicated at 34 in FIGS. 1 and 6 to form an abutment which limits the reciprocation of the tubular member 30 with the secondary supporting means.

The inwardly facing edge of each secondary supporting member 16 is provided with a recess 36 which adjacent the lower end has an upwardly facing inclined cam surface 38 and adjacent the upper end a downwardly facing inclined cam surface 40. The second reciprocable control means, i.e. the rod 22, extends through the spindle through a central bore in the sleeve 24 and is adjacent the top end connected with a spring 42, the other end of which is connected with a downwardly extending pin 44 on a closure member 46. The spring 42 operates to normally reciprocate the rod 22 in one direction, i.e. upwardly, so as to engage an upwardly facing conical cam surface 48*a* of an abutment 48 secured on the rod 22 with the downwardly facing cam surface 40 of the secondary supporting member as shown in the left hand side of FIG. 6.

Hereby the entire tubular structure 30 is reciprocated in upward direction to the position shown in the left hand side of FIG. 6 with the lower edge of the aperture 32 in engagement with the abutment 34.

To render the secondary supporting members effective the abutment 48 is provided with a downwardly facing conical cam surface 48*b* operable to engage the upwardly facing cam surface 38 in response to downward reciprocation of the rod 22, see the position of the parts shown in the right hand side of FIG. 6. The downward reciprocation of the tubular structure 30 is limited by the engagement of the abutment 34 with the top edge of the aperture 32.

It will be appreciated that hereby a limited reciprocation of the entire secondary supporting means is provided which enables the knife members 18 of the secondary supporting means to move downwardly in the centre hole of the next lowest record of the stack supported on the primary supporting means until the knife members arrive at the space between the lowest and the next lowest record in which position the co-operating cam surfaces 38 and 48*b* will cause the secondary supporting means to be rendered effective by urging the knife members 18 out in the space between the two records and also cause the outwardly facing surface of the secondary supporting means to engage with the centre hole of the next lowest record as shown in the right hand side of FIG. 6. It will be appreciated that this mode of operation substantially corresponds to the mode of operation disclosed in my U.S. Patent 2,604,325 to which reference is hereby made.

From the foregoing description of the spindle it will be understood that an important feature of the spindle is that the spindle comprises independent control means within the spindle operable in response to reciprocation to render the primary and the secondary supporting means effective. The use of independent control means renders the operation more reliable and also renders the spindle less critical with respect to tolerances in production and mounting of the parts. It will be appreciated that the individual control means for the primary and the secondary supporting means results in these advantages because during the operation of the spindle initially the control means, i.e. the rod 22 for the secondary supporting members, is reciprocated and can be moved through its entire stroke independently of the control means, i.e. the tubular member 20 for the primary supporting means so as to ensure that the secondary supporting means has been rendered effective before the second control means 20 is moved through its stroke.

The phonograph for use with a spindle as described hereabove has a turntable 50 mounted on a rotatable turntable bushing 52. The bushing 52 is mounted for rotation on a stationary hollow shaft 54 down through which the lower end of a spindle, i.e. the tubular member 20, extends. The hollow shaft 54 is mounted on a relatively stationary part such as a mounting chassis 54 for a subassembly of a phonograph, for example in a similar manner as described in my U.K. Patent No. 857,571 corresponding to my U.S. patent application Ser. No. 633,288, the disclosure of which is hereby made part of the present disclosure. The phonograph further comprises a tone arm, not shown, which in the manner described in the above named U.K. patent and the corresponding U.S. patent application may be moved to gauge the size of the next record to be supplied from the centre spindle to the turntable 50.

The phonograph further comprises a cycle control mechanism including a cam disc 56 operable by means of a cam follower mechanism in the manner disclosed in the above mentioned U.K. patent to move the tone arm between an end-of-play position of the record supported on the turntable to a record-drop position outside the periphery of the turntable and thereafter to start-of-play position of the record released by the primary supporting means 10 of the centre spindle.

For use with the spindle described hereinbefore the phonograph shown in FIG. 1 comprises first control means generally referred to by 58 of said cycle control mechanism operable to reciprocate the second elongated control means, i.e. the rod 22 of the spindle, in a direction to render the second supporting means 16 effective, and second control means generally referred to by 60, operable to reciprocate the first control means, i.e. the tubular member 20 of the centre spindle, to render the primary supporting means ineffective. The phonograph is further designed to time the operation of said first and said second control means of the control mechanism to render the secondary supporting means of the centre spindle effective substantially before initiation of the reciprocation of the first control means of the centre spindle to cause the release of the lowest record, as well as to complete the reciprocation of the first control means in the centre spindle, i.e. the tubular member 20 in a direction to render the primary supporting prongs effective to support a stack of records substantially before initiation of the reciprocation of the second control means, i.e. the rod 22 in the spindle in a direction to render the secondary supporting means 16 ineffective.

In more detail the first means 58 as well as the second means 60 of said control mechanism include knee-action link means operatively connecting the cam disc with actuating means for the reciprocable means within the centre spindle, both knee-action link means being substantially constructed as described in my copending U.K. patent application 16,916/59 and the corresponding U.S. patent application Ser. No. 29,305, the disclosure of which is hereby made part of the disclosure of the present application.

For this reason the knee-action link means will only be described in broad terms.

The first knee-action link means 58 comprises a reciprocating member 62 mounted for reciprocation below the chassis plate 54. The reciprocating member 62 is provided with a track follower pin 64 operable to engage a track generally referred to by 66 in the cam disc 56. Adjacent the end of the reciprocable member a tiltable structure 68 is mounted adapted to carry out tilting movements relatively to the reciprocating member 62. The tiltable member may be in the form of a wire member or the like bent in the manner clearly shown in FIG. 2 and arranged to engage with its transverse portion an annular groove in a member **20*d* secured to the reciprocable rod 22 so as to operatively convert the reciprocation of the member 62 into a knee-action reciprocation of the member 22**.

In a similar manner the secondary means 60 comprises a reciprocable member 70 having a track follower 72 for engagement with a track generally referred to by 74 in the cam disc, and a titltable member 76 adapted to engage a transverse groove of a solid member **20*f* secured to the tubular member 20. As shown in FIG. 3 in order to provide for engagement between the titltable knee-link member 68 and the portion 20*d* substantially half of the tubular member 20** is cut away at the lower end.

The member **20*f* is provided with a downwardly facing shoulder 20*g* operable to engage the top side of the transverse part of the tiltable knee-link member 76**.

In order to provide for safe mutual position between the parts of the spindle the control means 60 includes means for locking the primary reciprocating means 20 within the centre spindle in the position in which the primary prongs are effective to support the stack of records. More specifically said means includes a bracket 80 mounted below the chassis plate 54 and having portions extending on each side of the lower end of the centre spindle. Each of said extending portions is provided with guide slots 82 for the transverse portion of the tiltable knee-link member 76. Said guide slots have substantially vertical extending portions and adjacent the top end substantially horizontal extending portions. In the retracted position of the reciprocable member 70 the transverse portion of the tiltable knee-link member 76 is located in the top transverse portions of the guide slots 82 whereby the titltable knee-link member 76 is locked in inoperative position and by being locked also prevents downward reciprocation of the first reciprocable means 20 within the centre spindle by the engagement with the downwardly facing shoulder **20*g* whereby it is secured that the weight of a stack of records supported on the primary prongs will not cause downward reciprocation of the tubular member 20**. This also enables a relatively weak spring to be used within the centre spindle and thereby operation of the centre spindle at low power.

In a similar manner guide slots 84 are provided for the transverse portion of the tiltable knee-link member 68.

In the following it will be supposed that the slots in the centre spindle tube 14 in which the primary prongs are movable have a vertical extension which enables the prongs to be lowered so much before retraction that the lowest record is lowered sufficiently under the remaining part of the stack on the centre spindle to enable free engagement with the edge of the record by an abutment on the tone arm by means of which the size of the record is gauged, i.e. the general mode of operation of the primary prongs of the centre spindle substantially corresponds to my U.K. Patent No. 862,004 and the corresponding U.S. Patent 2,981,953, the disclosure of which is hereby made part of the present disclosure. It will also be supposed that the control mechanism and the feeler scheme correspond substantially to the feeling described in my U.K. Patent 852,061 or 852,064 and the corresponding U.S. patent application Ser. No. 602,589, which is hereby made part of the present disclosure.

The different sections of the tracks 66 and 74 in the cam disc will thereafter be described in more detail with reference to the following description of the mode of operation of the spindle and phonograph described hereinbefore.

With the spindle inserted in the hollow shaft 54 as shown in FIG. 1 the shoulder **20*g* engages the transverse portion of the tiltable knee-link member 76 which is locked in the upper transverse part of the guide slots 82. The prongs are in their projecting position effective to support a stack of records. The transverse portion of the tiltable knee-link member 68 is locked in the upper transverse portions of the guide slots 84 with the transverse portion out of engagement with the member 20*d* and by means of the spring 42 adjacent the top end of the centre spindle the second member 22** is reciprocated to the upper position in which the secondary supporting means is ineffective.

When after playing of a record or under manual control the rotation of the cam disc 56 is started, the tone arm lifting mechanism (not shown) initially raises the tone arm. At the same time the track follower 64 of the reciprocating member 62 enters an outwardly leading track section **66*a* which causes reciprocation of the member 62 in the direction of the arrow A shown in FIG. 2 and thereby engagement with the transverse portion of the tiltable knee-link member 68 and the groove of the member 20*d*. At the same time the track follower 72 of the reciprocable member 70 enters a track section 74*a* which, however, is a concentric track that leaves the knee-link structure 70, 76** in inoperative position.

The track **66*a* causes as mentioned reciprocation of the member 62 and thereby conversion of the reciprocation in the form of a tilting of the knee-link member 68 whereby the secondary means, i.e. the rod 22, is reciprocated downwards through a stroke which results in engagement of the downwardly facing cam surface 48*b* of the member 48 with the upwardly facing cam surface 38 of the secondary supporting means. The entire secondary supporting structure including the tubular member 30 will thereby move down until the knife members 18 are able to find the space between the next lowest and the lowest record whereafter the knife members will extend into the space and assume the position shown in the right hand side of FIG. 6 holding the next lowest record safely. The track follower 64 thereafter enters a concentric track portion 66*b*. At the same time the track follower 72 enters a short outwardly leading track portion 74b which results in reciprocation of the member 70 sufficient in the direction of the arrow B shown in FIG. 2 to result in a slight tilting of the tiltable knee-link member 76 and thereby a slight downward reciprocation of the first reciprocable means, i.e. the tubular member 20** within the spindle to slightly lower the prongs and thereby the record supported on the top ends of the prongs. The reason for this slight lowering is to secure that the lowest record does not remain "hanging" under the remaining stack of the records which might be the case if the lowest record is a lightweight record.

The track follower 72 thereafter enters a track portion 74c whereby the prongs remain in the slightly lowered position.

During these movements the tone arm has been moved outwardly to a position outside the periphery of the turntable.

The track follower 72 thereafter enters a further outwardly leading track section 74d which results in further reciprocotion of the member 70 in the direction of the arrow B and thereby converts this reciprocation in further tilting of the knee-link member 76 which again results in further downward reciprocation of the member 20 to a position in which the record supported on the top ends of the prongs is lowered so as to engage the edge of the record with an abutment on the tone arm. Said engagement takes place during further movement of the track follower 72 in a concentric track portion which interrupts the downward stroke of the member 20. When the feeling of the size of the record has been accomplished including the mutual adjustment of the parts of the control mechanism as described in the U.K. patents referred to hereabove, and the tone arm has been moved slightly outwards to be disengaged from the edge of the record, the track follower 72 is moved further in an outwardly leading track portion 74f which results in completion of the reciprocation of the member 70, corresponding tilting of the knee-link member 76 and completion of the downward reciprocation of the member 20 to cause retraction of the prongs as illustrated in the right hand side of FIG. 7, whereby the record is released and descends to the turntable.

Immediately upon release of the record the track follower 72 enters an inwardly leading track portion 74g followed by a concentric track portion 74h. This results in reciprocation of the member 70 in opposite direction of the arrow B and thereby reciprocation of the first member 20 within the centre spindle in the direction to render the primary prongs 10 effective to support the stack of records again.

When the prongs have been moved to the operative position the track follower 74 on the member 62 leaves the concentric track portion 66b and enters an inwardly leading track portion 66c whereby the member 60 is reciprocated in the opposite direction of the arrow A with the result that the secondary means 22 within the centre spindle is reciprocated upwardly by means of the spring 42 to render the secondary supporting means ineffective whereby the support of the track of records is taken over by the primary prongs 10.

In many cases a record changing phonograph is used as a single player. To this purpose the centre spindle may be removed and the upper end of the hollow shaft 54 used for centering a single record supported on the turntable. To prevent loss of the centre spindle in case of removal it may be desired, however, to lock the centre spindle in position. In such event it has not been possible to use a record changing phonograph having a centre spindle of the type hereinbefore described as a single player, because the extending prongs prevent depositing of a single record directly on the turntable.

The invention, however, provides for a phonograph having a centre spindle within primary and secondary supporting means and the means 60, 20 operable to render the primary supporting means only ineffective in combination with manual control means for activating said means in the event that it is intended to use the phonograph as a single player.

As will be appreciated the reciprocation of the knee-link structure 70, 76 only, without reciprocation of the structure 62, 68 results in lowering and retraction of the primary prongs 10 but leaves the secondary supporting members 16 ineffective. This can be utilized for the purpose of using the phonograph as a single player by connecting the reciprocable member 70 with a control handle which is movable to a predetermined position to close the phonograph motor switch without activating the cycle control mechanism, for example as described in my U.K. Patent No. 859,392 and the corresponding U.S. patent application Ser. No. 688,950, which is hereby made part of the disclosure of the present application. In such event the transverse track section as indicated at 75 in FIG. 2 is provided for allowing the passage of the track follower pin when the member 70 is reciprocated. Furthermore, the member 70 may be under influence of a spring which normally keeps the reciprocable member 70 in its inoperative position.

As will be appreciated such manual control means would cause the retraction of the prongs. The mechanism should include suitable means for locking the members 70, 76 and 20 in the reciprocated position with the prongs retracted.

Instead of providing a track 75 for allowing free movement of the track following pin 72 in such event the track follower pin 72 may as indicated in FIG. 3 be mounted for reciprocation under resilient action, and an auxiliary knee-link structure 90, 92 may be provided for reciprocation so as to initially engage the track follower pin 72 to move it down against the resilient action out of engagement with the cam disc. Thereafter the auxiliary knee-link structure is reciprocated by means of a suitable control member such as a rod 94 operatively connected with a structure 96 which is rotated by means of the single player operation handle.

A phonograph having a modified embodiment of the control mechanism for operating the reciprocable control members of the centre spindle is illustrated in FIGURES 8–12.

In these figures the parts already described with reference to FIGURES 1–7 are referred to by the same reference numerals as in the preceding figures.

The phonograph illustrated in FIGURE 8 is mounted on a base plate 100. The tone arm 120 is supported on a stationary post 122 and is mounted for swinging movement as well as for movement in vertical direction. The tone arm assembly includes two arms 124 and 126 of which the arm 124 is firmly connected with the tone arm spindle so as to swing with the tone arm. The arm 124 is an actuator arm for a trigger mechanism. The arm 126 is a cam track follower arm having adjacent its end a cam follower to be guided in tracks in the surface of the cam disc 56 whereby the horizontal swinging movements of the tone arm are controlled. For further details of this structure reference is made to my U.K. Patent No. 859,392 and the corresponding U.S. patent application Ser. No. 688,-950. These specifications are hereby made part of the disclosure of this application. The cam disc 56 is mounted for rotation below the chassis plate 100 on a stationary pin 128 which extends therebelow. The cam disc is driven from the gear wheel 132 which forms an integral part of the turntable bushing 52 by means of the idler wheel 134 which is mounted for rotation as well as for limited movement in radial direction relatively to the turntable centre by means of a pin 136 which extends through an elongated hole or slot in the chassis plate 100. A pair of washers 138 are supported on the pin 136 on each side of the chassis plate 100.

The cam disc 56 has a peripheral recess and the disengagement of the cam disc drive is caused by disengaging the idler gear wheel 134 from the gear wheel 132 by radial movement of the idler gear wheel 134 in a direction away from the turntable centre into the peripheral recess of the cam disc under influence of a spring 138.

The engagement of the idler gear wheel 134 with the gear wheel 132 is caused by the operation of a trigger mechanism which may be constructed according to my U.K. Patent No. 801,176 corresponding to U.S. patent application Ser. No. 491,422, if desired in an embodiment of this trigger mechanism as disclosed in my above named U.K. Patent No. 859,392. This trigger mechanism includes a first lever 140 mounted for swinging movement about a stationary pin 142 against a predetermined friction, and the striker 144 which is mounted for swinging movement as well as for reciprocation in response to engagement between its end and a rotating abutment 146 associated with the turntable spindle. The striker engages a surface portion of reduced area of the lever 140 in the form of a rib 141 in the top surface thereof so as to enable the striker 144 to be swung back in clockwise direction in FIGURE 9 by engagement with the rotating abutment 146 as long as the tone arm stylus follows a sound groove of a record during playing thereof. When after playing of the record the tone arm is moved inwards at a faster speed both trip starter levers are swinging faster inwards, whereby the abutment 146 will engage the end of the striker lever 144 and reciprocate this lever.

The lever 144 is pivotable about a pin 148 on the gear actuator lever 150 which is swingingly mounted on the top side of the chassis plate 100 about a pin 152. The reciprocation of the striker lever 144 will thereby cause the lever 150 to pivot about the pin 152 in clockwise direction as seen in FIGURE 9, whereby an arcuate cam edge 154 on the lever 150 will engage the upper one of the two washers 138 which are associated with the idler gear wheel spindle 136 so as to move the idler gear wheel 134 radially in the direction towards the turntable centre and thereby cause engagement with the gear wheel 132.

The cam disc 56 may be provided with teeth along its entire periphery also in the peripheral recess which controls the disengagement of the idler gear wheel 134 so as to secure immediate start of the rotation of the cam disc concurrently with engagement between the idler gear wheel 134 and the gear wheel 132.

The phonograph may be designed to play records of different sizes and include any convenient means for gauging the size of the next record to be played. By way of example the tone arm may be used for gauging the size of the next record according to a feeler scheme subject to my U.K. Patent No. 757,379 and the corresponding U.S. patent application Ser. No. 705,703 including any modifications of the cam disc arrangement as disclosed in my U.K. Patent Nos. 852,061 and 859,371 corresponding to my U.S. patent applications Ser. Nos. 602,589 and 633,288, the disclosures of which are hereby made part of the disclosure of this application.

The track arrangement which controls the swinging movements of the tone arm will therefore, only be referred to in very brief terms. In the surface of the cam disc a playing recess 162 is provided which extends to adjacent the periphery of the cam disc and has an outlet in the form of a track 164 which continues into an inwardly leading track 166—the feeler track. A landing track arrangement extends into the playing recess 162, and a stop control track 168 extends parallel with the periphery of the cam disc and merges into the playing recess 162 for controlling automatic start of the phonograph in the manner disclosed and claimed in my U.K. Patent No. 852,061 referred to hereabove. A lever 170 is pivotally arranged about a pin 172 on the top surface of the cam disc and has a portion which extends into the orbit of the stop track so that when the track follower on the track follower arm passes through the stop track 168 the lever or arm 170 will be swung clockwise about the pivot 172 and thereby engage an abutment 174 on the switch actuator lever 176 which is pivotable about a stationary pin 178. The lever 176 has an activating member such as a pin for activating the switch 180. The lever 176 is movable between two exterior positions, a switch-on position and a switch-off position, and is influenced by a snap action spring 182 so that the lever 176 only can assume one of these two positions.

A reciprocable control member 160 is also designed and located to actuate the switch control member 76. More specifically the right hand end of the elongated member 160 engages a notch in the switch control lever 176 in such a manner that by reciprocation of the member 160 in the right hand direction it will cause swinging of the switch control lever 176 to the switch-off position, while by reciprocating the member 160 in the left hand direction, the switch control lever 176 will be swung to the switch-on position. The structure is so designed that when the lever 176 is swung to the switch-on position the end of the member 160 can be disengaged from the switch control lever 176 and by further reciprocation in the left hand direction come into engagement with the gear actuator lever 150 and thereby be moved further through its stroke beyond that part of the stroke which controls the movement of the switch actuator lever 176 from the off-position to the on-position come into engagement with the left hand end of the gear actuator lever and thereby pivot the gear actuator lever in the same direction as caused by the operation of the striker lever 144, i.e. to cause the engagement of the idler gear wheel 134 with the driving gear wheel 132. In other words, the last part of the stroke of the member 160 is a reject-stroke which renders the cycle control mechanism effective.

As will be appreciated the switch 180 can be actuated either automatically from the cam disc in response to the operation of the stop track, or under manual control by actuation of the control knob on the control spindle 156.

The raising and lowering of the tone arm is controlled by means of a reciprocable pin 184 mounted within the hollow tone arm spindle into engagement with a leaf spring 122 which is bent upwards in response to engagement with an inclined cam surface 186 on a reciprocable lever 188. The left hand end of the lever 188 is slotted and guided on the cam disc pin 128 above a spring washer 190 secured adjacent the lower end of said pin. The right hand end of the lever 188 is guided for reciprocation on two branches of a wire spring 192 the shape of which appears most clearly from FIGURE 9. The ends of this wire spring are by means of screws 94 secured on a pair of depending posts 196 rigidly secured to the tone arm bearing structure. A bridge member 198 is also secured on the post 196 so that the bridge member as shown in FIGURE 9 is located slightly above the spring 192. In the bridge member 198 a screw-threaded hole 200 is provided for receiving the lower end of a member 202 operable to adjust the height to which the tone arm is raised. The reciprocation of the lever 188 is controlled by means of a track follower 189 which engages a track 104 in the underside of the cam disc.

In the embodiments of FIGURES 9–12 the mechanism for controlling the reciprocation of the control members 20 and 22 of the centre spindle includes a reciprocable lever 204 which is slotted at its right hand end and guided on the pin which supports the cam disc above the spring washer clamped thereon. The reciprocable lever 204 is provided with a track follower 206 operable to engage a track in the underside of the cam disc 56 to thereby control reciprocation of the lever 204.

In the modification of FIGURES 9–12 the stationary structure 80 which provides a guide for the actuator members of the elongated reciprocable control members 20 and 22 of the centre spindle is provided with a pair of opposite slots 207, each being provided with a sidewardly extending portion 208 in the top end.

A U-shaped structure 209 is pivotally supported at 210 on the relatively stationary structure 80. The structure 209 is provided with side portions 211 and 212 in each of which opposite cam tracks 213 and 214 are provided for receiving actuator pins 215 and 216 which extend through the structures 209 and 80 and are secured in position in these structures for example by spring washers secured at the end of the actuator pins 215 and 216.

As will be obvious from this description the actuator pins 215 and 216 will be reciprocated in the slots 207 of the structure 80 in response to the pivoting of the structure 209 governed by the reciprocation of the lever 204 and the configuration of the tracks 213 and 214.

The embodiment shown in FIGURE 9 includes means for rendering the change cycle mechanism inoperative in response to the selection of a predetermined drive speed for the turntable. This enables the phonograph to be designed as a record changing phonograph for a plurality of speeds, for example 45 r.p.m. and 33⅓ r.p.m. with a minimum of change cycle time for these speeds and to be used as a single player for 78 r.p.m. Alternatively, it also provides for designing the phonograph as a record changing phonograph for 78 r.p.m. and 45 r.p.m. and a single player for 33⅓ r.p.m. by appropriate selection of the change cycle time.

To this purpose a blocking member 310 for the gear actuator lever 150 is provided in the form of a lever pivotally mounted at 312 between an operative position with an abutment 314 in position to be engaged by the left hand end of the gear actuator lever 150 and an inoperative position.

The selection of the operative and inoperative positions of the blocking member 310 is made in response to speed selection by means of a pin 316 which extends downwardly from the speed selector knob 159 which engages a cam surface 318 on the lever 310 remote from its abutment 314.

Furthermore, a slot is provided in the gear actuator lever 150 to enable the lever to move relatively to its pivot pin 152 and thereby also enabling the gear actuator lever to swing about the point of engagement between its left hand end and the abutment 314 when the latter is in the operative position.

The switch actuator lever 176 has an extension **176*a* with an abutment 177 in the form of an upwardly extending flap adapted to be engaged by the rear edge of the gear actuator lever 150 when the latter is swung about its point of engagement with the abutment 314**.

The general layout of the mechanism described hereabove and its mode of operation is disclosed in the complete specification accompanying my U.K. patent application 16389/61 and the corresponding U.S. patent application Ser. No. 191,600, the disclosures of which are hereby made part of the disclosure of this application.

Therefore in the following only that part of the mode of operation which concerns the centre spindle will be described in detail.

With the cam disc 56 in the position assumed during the playing of a record the spindle control lever 204 is reciprocated to its exterior right hand position and the structure 209 is in the position illustrated in FIGURE 11.

In this position the actuator pins 215 and 216 are positioned in the left hand ends of the tracks generally referred to by 213 and 214 of which the track 213 has a first portion **213*a* and the track 214 a first portion 214*a* which is substantially concentric with the pivot 210. The track configurations are so that in the position shown in FIGURE 11 the actuator pin is in its top position located substantially in the sidewardly directed extension 208 of the track 207 in the structure 80 which is the position in which the secondary supporting means 16 is inoperative. Also in the position illustrated in FIGURE 11 the actuator pin 216 is located at the intersection of the tracks 207 and the end of the track portion 214*a* which is the operative position of the primary supporting prongs 10**.

As will be obvious from FIGURE 11 both of the actuator members 20 and 22 are locked in this position and the weight of a stack of records supported on the top ends of the prongs will not enable the prongs to be lowered nor retracted.

When the cam disc is started and assuming that the record changer is designed as a true intermixer with the gauging of the size of the lowest record in a position below the remaining part of the stack of records, the lever 204 will immediately be reciprocated in the direction of the arrow shown in FIGURE 11. Since the first track portion **214*a* of the track 214 is concentric with the pivot 210 the actuator pin 216 will remain in the same position of the tracks 207 of the structure 80 during the initial part of the pivoting of the structure 209 while during this pivoting the actuator pin initially will be moved slightly to the left to enter the vertical tracks 207 of the structure 80 and be moved down in these vertical tracks whereby the secondary supporting structure will be rendered operative in the manner described with reference to FIGURES 1–7 and cause the wedge members 18** to find their way into the space between the lowest and the next to the lowest record.

This part of the operation is completed when the structure 209 has been tilted so much that the second portion **214*b* of the track 214 arrives at the pin 216 and a second portion 213*b* of the track 213 reaches the pin 215**.

The track portion **213*b* is substantially concentric with the pivot 210 while the track portion 214*b* in response to further reciprocation of the lever 204 and thereby pivoting of the structure 209 now moves the pin 216 downwards and thereby reciprocates the tubular control member 20** downwards to a position in which the lowest record is supported on the top surface of the prongs below the remaining part of the stack.

The remaining tracks of the cam disc are timed with the reciprocation of the lever 204 and the pivoting of the structure 209 in such a manner that during the following passage of a third track portion **214*c* of the track 214 which also is concentric with the pivot 210** the tone arm is moved inwards to gauge the size of the records now supported on the prong ends below the remaining part of the stack on the centre spindle and by this gauging condition the control mechanism for correct landing of the tone arm with its stylus in start-of-play position on the record when it has been dropped to the turntable.

When the gauging of the record has been completed the tone arm is disengaged from the edge of the record to enable free drop of the record, and the reciprocation of the lever 204 in the direction of the arrow shown in FIGURE 11 as well as the pivoting of the structure 209 is completed to the position shown in FIGURE 12. During this last movement a fourth track portion **214*d* causes the downward movement of the actuator pin 216 to reciprocate the tubular member 20** to its lowest position so as to enable the prongs to be retracted to the position shown in FIGURE 12 and as explained with reference to FIGURES 1–7, whereby the record is dropped to the turntable. Thereafter the tone arm is moved inwards and landed with its stylus into engagement with the top surface of the record in start-of-play position.

In the foregoing specification the tone arm structure shown in FIGURE 10 has not been described in detail. As shown in FIGURE 10 the track follower arm 126 is in the form of an extension of a washer 127 which is tiltably supported below a washer 131 by means of a pair of spacers, e.g. balls which are located diametrically opposite the axis of the tone arm spindle and engage an opposite pair of positioning holes in the washers 127 and 131 respectively. The trip starter actuator arm 124 is also a part of a washer 125 with which a bushing **125*a* is rigidly connected. A positioning screw 125*b* is provided in the bushing 125*a* for securing the washer structure 125, 124 on the tone arm spindle. Between the washers 125 and 131 a friction disc or washer 129** is positioned and the whole structure is assembled by means of a spring 137, a sleeve 139 and a spring washer 131 which engages in an annular recess 143 at the lower end of the tone arm spindle.

As described in my U.K. patent application 16389/61 and U.S. patent application Ser. No. 191,600 referred to hereabove the blocking lever 310 can be actuated in response to the selection of a predetermined turntable speed to prevent pivoting of the gear actuator lever 150 so as to enable the phonograph to be used as a single player.

In order to automatically retract the prongs 10 in such event to enable a record to be unobstructedly guided along the centre spindle to be deposited by hand on the turntable, a structure as indicated in FIGURE 13 may be included comprising a lever 320 which extends sidewardly from the blocking lever 310 and at the end of which a pivotable lever 322 is provided the lower end of which is operable to engage the pin 216 to reciprocate the pin downwards to render the tubular control member 20 operable to retract the prongs.

In the embodiment of FIGURE 13 a substantially vertical extension 324 of the track 214 is provided in registry with the tracks 207 of the structure 80. A spring-loaded pivotable member 326 is supported on the structure 209 in position normally to block the entrance to the track 324. The member 326 is provided with a flap 328 to be engaged by an inclined cam surface 330 at the end of the pivotable lever 322 so as to pivot the member 326 in clockwise direction of FIGURE 13 in response to engagement with the cam 330 and thereby open the entrance to the track 324 whereafter the further pivoting of the lever 322 causes engagement with the pin 216 and moves it down through the track 324.

It will be obvious that also other possibilities are provided for automatically retracting the prongs 10 in response to setting of the mechanism for manual use.

It will be obvious from the foregoing specification that the centre spindle on account of its interior duplex control is less critical with respect to precise tolerances in production than existing centre spindles of the prong type and does not require any adjustment of the spindle itself.

In addition the duplex control of the centre spindle has the advantage that the spindle can be operated at substantially reduced force in comparison wtih the existing prong type spindles whereby the strain on the change cycle mechanism is reduced.

In the case of a prong type spindle having a single reciprocable control member it is necessary first to tension the spring at the top end to render the secondary supporting means effective. Since, however, the same reciprocable control member also is used for retracting the prongs, the stroke must be substantially longer and therefore a larger spring must be used which has to be tensioned further without any useful purpose during the remaining part of the stroke that is necessary to retract the prongs.

In the spindle according to this invention, however, no more reciprocation of the control member 22 which operates the secondary supporting means is necessary than to render the secondary supporting means effective and the spring load on the primary supporting prongs can be made relatively light.

Therefore, the present spindle obviates the necessity of heavy tensioning of any parts during the operation of the spindle and thereby also contributes to cost reductions by enabling certain parts of the change cycle mechanism which would otherwise have to be designed for heavy tensioning constructed of thinner material which again reduces the weight.

Though the invention in the foregoing has been described in great detail with reference to various modifications it will be understood that the invention is not limited to the embodiments shown and described and that further modifications will be possible within the scope of the invention.

I claim:

1. In a phonograph record changer, a vertical hollow tubular center spindle for a stack of records, having a plurality of elongated slots, a plurality of primary supporting prongs, each having a body portion provided with a top end and with an outwardly facing inclined cam surface and each being movable in one of said slots between an inclined extending position operable to support a stack of records on the top ends of said prongs and in response to engagement of said inclined cam surface with the lower end of the slot by downward movement of said prongs to a retracted position allowing a record to descend along said guiding pin, secondary supporting means for temporarily holding the next to the lowest record of a stack supported on said upwardly facing prong ends, a reciprocable elongated tubular member mounted inside said center spindle and operable to exclusively control the movement of said prongs between said record supporting positions and said retracted positions, an elongated reciprocable control member mounted inside said reciprocable tubular member and operable to exclusively control the actuation of said secondary supporting means, and cycle control means operatively connected with said tubular member as well as with said reciprocable control member and operable to reciprocate both said members independently of one another and in opposite timed relationship to render said prongs ineffective after said secondary supporting means have been rendered effective and vice versa, and means in the operative connection between said cycle control means and said tubular member and operable to prevent axial displacement of said tubular member independently of said elongated reciprocable control member until after activation of said cycle control means.

2. In a phonograph record changer, a vertical hollow central guiding and supporting pin for a stack of records, having a plurality of elongated slots, a plurality of primary supporting prongs, each having a body portion provided with a top end and with an outwardly facing inclined cam surface and being movable in one of said slots between an inclined extending position operable to support a stack of records on the top ends of said prongs and a retracted position allowing a record to descend along said guiding pin, secondary supporting means for temporarily holding the next to the lowest record of a stack supported on said outwardly facing prong ends, an elongated tubular member mounted for reciprocation inside said guiding pin having an open-sided end extending beyond the end of said guiding pin remote from said secondary supporting means and being operable to exclusively control the movement of said prongs between said record supporting positions and said retracted positions in response to reciprocation, an elongated member mounted for reciprocation inside said tubular member having an end extending at least into said open-sided extending end of said tubular member and being operable to exclusively control the operation of said secondary supporting means to render the latter effective and ineffective in response to reciprocation in opposite directions, cycle responsive means including first means operatively connected with said extending end of said tubular member and second means operatively connected with said extending end of said elongated member and being operable to control the reciprocation of said tubular member and said reciprocable control member in timed relationship to render said prongs and said secondary supporting means effective and ineffective in opposite timed relationship.

3. In a phonograph record changer, a vertical hollow central guiding and supporting pin for a stack of records, having a plurality of elongated slots, an elongated tubular control member having an end extending beyond one end of said guiding pin and being mounted for reciprocation inside said guiding pin, a plurality of primary supporting prongs, each having a body portion provided with a top end and with an outwardly facing inclined cam surface, means operatively connecting said prongs with said tubular control member and operable to effectively move said prongs in said slots between an inclined extending position operable to support a stack of records on the top ends of said prongs and a retracted position allowing a record to descend along the guide pin in response to reciprocation of said tubular control member, a relatively thin elongated reciprocable control member mounted in said guide pin inside said tubular control member, secondary supporting means for temporarily holding the next to the lowest record of a stack supported on said upwardly facing prong ends, first cam means on said elongated member operable to render said secondary supporting means ineffective, second cam means on said elongated member operable to render said secondary supporting member effective, and cycle responsive means operable to control the reciprocation of said tubular member and said elongated reciprocable member in timed relationship to render said prongs and said secondary supporting means effective and ineffective in opposite timed relationship.

4. In a phonograph record changer, a vertical hollow central guiding and supporting pin for a stack of records, having a plurality of elongated slots, an elongated tubular control member having an end extending beyond one end of said guiding pin and being mounted for reciprocation inside said guiding pin, a plurality of primary supporting prongs, each having a body portion provided with a top end and an outwardly facing inclined cam surface, means operatively connecting said prongs with said tubular control member and being operable to hold said prongs in position operable to support a stack of records on the top ends of said prongs and in response to reciprocation of said tubular control member to displace said prongs to render said prong cam surfaces effective to retract said prongs to allow a record to descend along the guide pin, a second interior elongated reciprocable control member mounted in said guide pin inside said tubular control member, secondary supporting means for temporarily holding the next to the lowest record of a stack supported on said outwardly facing prong ends, cam means operatively connecting said interior elongated control member with said secondary supporting means to render said secondary supporting means effective and ineffective in response to reciprocation of said interior control member in opposite directions, and cycle responsive means operable to control the reciprocation of said tubular control member as well as said second reciprocable control member in timed relationship to render said prongs and said secondary supporting means effective and ineffective in opposite timed relationship.

5. In a phonograph record changer, a vertical tubular center spindle for a stack of records, having a plurality of elongated slots, an elongated tubular control member having means extending beyond one end of said tubular spindle and being mounted for reciprocation within said tubular spindle, a plurality of primary supporting prongs in respective of said slots and each having a body portion provided with a top end and an outwardly facing cam surface operable to retract said prong in response to sliding engagement with a respective slot end, means operatively connecting said prongs with said tubular control member and being operable to hold said prongs projecting through said slots in position operable to support a stack of records on the top ends of said prongs and in response to reciprocation of said tubular control member to effectively provide said sliding engagement between said prong cam surface and said slot ends to retract said prongs to allow a record to descend along said spindle, a second interior elongated reciprocable control member mounted in said tubular center spindle inside said tubular control member thereof, secondary supporting means for temporarily holding the next to the lowest record, of a stack supported on said outwardly facing prong ends, comprising a plurality of relatively flat members in respective of said slots being provided with outwardly facing wedge-like members operable to enter the space between the lowest and the next to the lowest record of a stack as well as with inwardly facing first and second cam means, first and second cam means in said interior control member operable to engage said first and second cam means of said flat secondary supporting members to render said secondary supporting means effective and ineffective, respectively, in response to reciprocation of said interior control member in opposite direction, and cycle responsive means operable to control the reciprocation of said tubular control member as well as said second control member in timed relationship to render said prongs and said secondary supporting means effective and ineffective in opposite timed relationship.

6. In a phonograph record changer, a vertical hollow central guiding and supporting pin for a stack of records, having a plurality of elongated slots, a plurality of primary supporting prongs, a first reciprocable control means operable exclusively to move said prongs between an upwardly inclined extending position to effectively support a stack of records on the top ends of said prongs and a retracted position within said guide pin allowing a record to descend along said guide pin, a secondary supporting structure operable to temporarily hold the next to the lowest record of the stack supported on said prong ends including a tubular member mounted for reciprocation within said guide pin and having a plurality of elastic fingers extending in axial direction of said guide pin, a plurality of secondary supporting members secured to said elastic fingers including outwardly facing means operable to enter the space between the lowest and the next to the lowest record of the stack, and inwardly extending cam means, a second reciprocable control means mounted for reciprocation within said guide pin and inside said first reciprocable control means, cam means on said second reciprocable control member operable to reciprocate said secondary supporting structure in axial direction of said guide pin between a position of said outwardly facing means spaced a first predetermined distance from said prong ends which substantially corresponds to the thickness of the thickest record to be handled, and a second predetermined distance from said prong ends which substantially corresponds to the thickness of the thinnest record to be handled, as well as operable to project said supporting members to render said outwardly extending means effective to enter the space between the lowest and the next to the lowest record of a stack, and cycle responsive control means operable to control the reciprocation of said first and said second reciprocable control means in timed relationship to render said prongs and said secondary supporting means effective and ineffective in opposite timed relationship.

7. In a phonograph record changer, a vertical hollow central guiding and supporting pin for a stack of records, having a plurality of elongated slots, a plurality of primary supporting prongs mounted for movement in respective ones of said slots, a first reciprocable control means operable exclusively to move said prongs between a projecting upwardly inclined operative position to effectively support a stack of records on the top ends of said prongs and a retracted inoperative position within said guide pin allowing a record to descend along said guide pin, a secondary supporting structure operable to temporarily hold the next to the lowest record of the stack supported on said prong ends including a tubular member mounted for reciprocation within said guide pin and having a plurality of elastic fingers extending in axial direction of said guide pin, a plurality of secondary supporting, relatively flat members secured to said elastic fingers each having an outwardly facing wedge-like portion operable to enter the space between the lowest and the next to the lowest record of a stack, and inwardly extending cam means and being mounted for movement in respective ones of said guide pin slots, a second reciprocable control means mounted for reciprocation within said guide pin and inside said first reciprocable control means, cam means on said second reciprocable control member operable to reciprocate said secondary supporting structure in axial direction of said guide pin as well as to project said supporting members to render said wedge-like portions effective to enter the space between the lowest and the next to the lowest record of a stack, means operable to limit said reciprocation between a first position of said wedge-like portions spaced a distance from said prong ends which substantially corresponds to the thickness of the thickest record to be handled, and a second position spaced a distance from said prong ends which substantially corresponds to the thickness of the thinnest record to be handled, and cycle responsive control means operable to control the reciprocation of said first and said second reciprocable control means in timed relationship to render said prongs and said secondary supporting means effective and ineffective in opposite timed relationship.

8. As an article of manufacture for use in a phonograph record changer: a tubular central guiding and supporting pin for a stack of records, having a plurality of elongated slots, a plurality of primary supporting prongs movable in respective of said slots and each having a body portion, a foot portion provided with an outwardly facing hook-like member and an outwardly facing cam surface spaced a predetermined distance from said hook-like member and operable to retract said prongs from a projecting inclined position thereof in response to sliding engagement with a respective slot end, an elongated tubular member mounted for reciprocation within said guide pin and having apertures operable to receive said prong hook-like members to effectively provide pivots for said prongs and being substantially in registry with said guide pin slots and spaced a distance from said end of said tubular control member substantially corresponding to said distance between said prong hook-like members and said prong cam surfaces, means inside said tubular control member operable to tilt said prongs about said prong pivots to project said prongs through said guide pin slots into inclined record supporting position of said prongs, a secondary supporting structure operable to temporarily hold the next to the lowest record of the stack supported on said prong ends including a plurality of secondary supporting members having outwardly facing means operable to enter the space between the lowest and the next to the lowest record of the stack, and inwardly extending cam means, a second reciprocable control member mounted for reciprocation within said guide pin and inside said tubular control member, and cam means on said second reciprocable control member operable to reciprocate said secondary supporting structure in axial direction of said guide pin between a position of said outwardly facing means spaced a first predetermined distance from said prong ends and a second predetermined distance from said prong ends, as well as to project said supporting members to render said outwardly extending means effective to enter the space between the lowest and the next to he lowest record of a stack.

9. As an article of manufacture for use in a phonograph record changer: a tubular central guiding and supporting pin for a stack of records, having a plurality of elongated slots, a plurality of primary supporting prongs movable in respective of said slots and each having a body portion, a foot portion provided with an outwardly facing hook-like member and spaced a predetermined distance therefrom, an outwardly facing cam surface operable to retract said prongs from a projecting inclined position thereof in response to sliding engagement with the respective slot end, a first elongated tubular member mounted for reciprocation within said guide pin and having an elongated portion of smaller exterior diameter than the interior diameter of said tubular guide pin and a tapered end portion of increased diameter which adjacent its end substantially corresponds to the interior diameter of said guide pin and being provided with apertures receiving said prong hook-like members to effectively provide pivots for said prongs and being substantially in registry with said guide pin slots and spaced a distance from said end of said tubular control member substantially corresponding to said distance between said prong hook-like members and said prong cam surfaces, a member yieldingly mounted inside said tubular control member operable to engage said prong foot portions to effectively tilt said prongs about said prong pivots to project said prongs through said guide pin slots into inclined record supporting position of said prongs as well as to yield in response to sliding engagement between said prong cam and said respective guide pin slot ends when said tubular control member is reciprocated, a secondary supporting structure operable to temporarily hold the next to the lowest record of the stack supported on said prong ends including a tubular member mounted for reciprocation within said guide pin and having a plurality of elastic fingers extending in axial direction of said guide pin, a plurality of secondary supporting members secured to said elastic fingers including outwardly facing means operable to enter the space between the lowest and the next to the lowest record of the stack, and inwardly extending cam means, a second reciprocable control member mounted for reciprocation within said guide pin and inside said first reciprocable control means, and cam means on said second reciprocable control member to reciprocate said secondary supporting structure in axial direction of said guide pin between a position of said outwardly facing means spaced a first predetermined distance from said prong ends which substantially corresponds to the thickness of the thickest record to be handled, and a second predetermined distance from said prong ends which substantially corresponds to the thickness of the thinnest record to be handled as well as to project said supporting members to render said outwardly extending means effective to enter the space between the lowest and the next to the lowest record of a stack.

10. In a phonograph record changer, a vertical tubular central guiding and supporting pin for a stack of records, having a plurality of elongated slots, a plurality of primary supporting prongs movable in respective of said slots and each having a body portion, a foot portion provided with an outwardly facing hook-like member and spaced a predetermined distance therefrom, an outwardly facing cam surface operable to retract said prongs from a projecting inclined position thereof in response to sliding engagement with the respective slot end, a first elongated tubular member mounted for reciprocation within said guide pin and having an elongated portion of smaller exterior diameter than the interior diameter of said tubular guide pin and a tapered end portion of increased diameter which adjacent its end substantially corresponds to the interior diameter of said guide pin and being provided with apertures receiving said prong hook-like members to effectively provide for said prongs and being substantially in registry with said guide pin slots and spaced a distance from said end of said tubular control member substantially corresponding to said distance between said prong hook-like members and said prong cam surfaces, a member yieldingly mounted inside said tubular control member operable to engage said prong foot portions to effectively tilt said prongs about said prong pivots to project said prongs through said guide pin slots into inclined record supporting position of said prongs as well as to yield in response to sliding engagement between said prong cams and said respective guide pin slot ends when said tubular control member is reciprocated, a secondary supporting structure operable to temporarily hold the next to the lowest record of the stack supported on said prong ends including a tubular member mounted for reciprocation within said guide pin and having a plurality of elastic fingers extending in axial direction of said guide pin, a plurality of secondary supporting members secured to said elastic fingers including outwardly facing means operable to enter the space between the lowest and the next to the lowest record of the stack, and inwardly extending cam means, a second reciprocable control member mounted for reciprocation within said guide pin and inside said first reciprocable control means, cam means on said second reciprocable control member operable to reciprocate said secondary supporting structure in axial direction of said guide pin between a position of said outwardly facing means spaced a first predetermined distance from said prong ends which substantially corresponds to the thickness of the thickest record to be handled, and a second predetermined distance from said prong ends which substantially corresponds to the thickness of the thinnest record to be handled, as well as to project said supporting members to render said outwardly extending means effective to enter the space between the lowest and the next to the lowest record of a stack, and cycle responsive control means operable to control the reciprocation of said first and said second reciprocable control means in timed relationship to render said prongs and said secondary supporting means effective and ineffective in opposite timed relationship.

11. In a phonograph record changer, a vertical hollow central guiding and supporting pin for a stack of records, having a plurality of elongated slots, a first elongated control member mounted for reciprocation inside said guiding pin, a plurality of primary supporting prongs, each having a body portion provided with a top end and an outwardly facing inclined cam surface, means operatively connecting said prongs with said first control member and being operable to hold said prongs in position operable to support a stack of records on the top ends of said prongs and in response to reciprocation of said first control member to displace said prongs to render said prong cam surfaces effective to retract said prongs to allow a record to descend along the guide pin, a second reciprocation within said guide pin, secondary supporting means for temporarily holding the next to the lowest record of a stack supported on said outwardly facing prong ends, means operatively connecting said second control member with said secondary supporting means to render said secondary supporting means effective and ineffective in response to reciprocation of said second control member in opposite directions, a relatively stationary structure having slots laterally disposed relatively to said guide pin adjacent the lower end thereof, a first actuator member mounted for reciprocation in said slots, a second actuator member mounted for reciprocation in said slots, means operatively connecting said first actuator member with said first control member, means operatively connecting said second actuator member with said second control member, and cycle responsive means operable to control the reciprocation of said first and said second actuator members in timed relationship to thereby reciprocate said control members and render said prongs and said secondary supporting means effective and ineffective in opposite timed relationship.

12. In a phonograph record changer, a hollow guiding and supporting pin for a stack of records, having a plurality of primary supporting prongs operable to effectively provide primary record supporting means for a stack of records, and secondary supporting means operable to temporarily hold the next to the lowest record of a stack during release of the lowest record of said stack by retraction of said prongs: an elongated primary control member mounted for reciprocation within said guiding pin, means operatively connecting said prongs with said primary control member operable exclusively to render said prongs effective to support said stack of records and ineffective to allow a record to move along said guide pin in response to reciprocation of said primary control member, a secondary elongated reciprocable control member mounted in said guide pin inside said primary control member, and means operatively connecting said second elongated control member with said secondary supporting means operable exclusively to render said secondary supporting means effective and ineffective in response to reciprocation of said second control member, a first actuator member, a second actuator member, a relatively stationary structure having portions laterally disposed relatively to said guide pin adjacent the lower end thereof, slots in said structure portions operable to guide said actuator members for reciprocation in axial direction of said guide pin, means operatively connecting said first and said second actuator member with said primary and said secondary control member respectively to effectively reciprocate said control members in response to the reciprocation of said actuator members in said slots of said structure portions, and means operable to time said reciprocations to alternately render said primary and said secondary supporting means effective.

13. In a phonograph record changer having a change cycle control means: a vertical hollow central guiding and supporting pin for a stack of records, having a plurality of elongated slots, a first elongated control member having an end extending beyond one end of said guide pin and being mounted for reciprocation inside said guide pin, a plurality of primary supporting prongs, each having a body portion provided with a top end and an outwardly facing inclined cam surface, means operatively connecting said prongs with said first control member and being operable to hold said prongs in position operable to support a stack of records on the top ends of said prongs and in response to reciprocation of said first control member to displace said prongs to render said prong cam surfaces effective to retract said prongs to allow a record to descend along the guide pin, a second interior elongated reciprocable control member mounted for reciprocation in said guide pin and having an end extending beyond one end of said guide pin, secondary supporting means for temporarily holding the next to the lowest record of a stack supported on said outwardly facing prong ends, means operatively connecting said second control member with said secondary supporting means to render said secondary supporting means effective and ineffective in response to reciprocation of said interior control member in opposite directions, a first pin-shaped actuator member disposed adjacent said extending end of said first control member and extending transversely thereto, means operatively connecting said first actuator member with said first control member and operable to reciprocate said control member in response to translatory displacement of said actuator member, a second pin-shaped actuator member disposed adjacent said extending end of said second control member, means operatively connecting said second actuator member with said second control member operable to reciprocate said second control member in response to a translatory displacement of said second actuator member, a relatively stationary structure having portions extending laterally of said extending ends of said first and said second control members, means including slots in said structure portions operable to receive said pin-shaped actuator members as well as to guide said actuator members for translatory displacement to effectively reciprocate said control members, and means operable in response to change cycle of said phonograph to control said translatory displacement of said first and said second actuator members to alternately render said prongs and said secondary supporting means effective, and cycle responsive means operable to control the reciprocation of said tubular control member as well as said second reciprocable control member in timed relationship to render said prongs and said secondary supporting means effective and ineffective in opposite timed relationship.

14. In a phonograph record changer having a change cycle control means: a vertical hollow central guiding and supporting pin for a stack of records, having a plurality of elongated slots, a first elongated control member having an end extending beyond one end of said guide pin and being mounted for reciprocation inside said guide pin, a plurality of primary supporting prongs, each having a body portion provided with a top end and an outwardly facing inclined cam surface, means operatively connecting said prongs with said first control member and being operable to hold said prongs in position operable to support a stack of records on the top ends of said prongs and in response to reciprocation of said first control member to displace said prongs to render said prong cam surfaces effective to retract said prongs to allow a record to descend along the guide pin, a second interior elongated reciprocable control member mounted for reciprocation in said guide pin and having an end extending beyond one end of said guide pin, secondary supporting means for temporarily holding the next to the lowest record of a stack supported on said outwardly facing prong ends, means operatively connecting said second control member with said secondary supporting means to render said secondary supporting means effective and ineffective in response to reciprocation of said interior control member in opposite directions, a first pin-shaped actuator member disposed adjacent said extending end of said first control member and extending transversely thereto, means operatively connecting said first actuator member with said first control member and operable to reciprocate said control member in response to translatory displacement of said actuator member, a second pin-shaped actuator member disposed adjacent said extending end of said second control member, means operatively connecting said second actuator member with said second control member operable to reciprocate said second control member in response to a translatory displacement of said second actuator member, a relatively stationary structure having portions extending laterally of said extending ends of said first and said second control members, means including slots in said structure portions operable to receive said pin-shaped actuator members as well as to guide said actuator members for translatory displacement to effectively reciprocate said control members, means in said structure operable to prevent displacement of said first actuator member in said slots, and means operable in response to change cycle of said phonograph to control said translatory displacement of said first and said second actuator members to alternatively render said prongs and said secondary supporting means effective, and cycle responsive means operable to control the reciprocation of said tubular control member as well as said second reciprocable control member in timed relationship to render said prongs and said secondary supporting means effective and ineffective in opposite timed relationship.

15. In a phonograph record changer having a change cycle control means: a vertical hollow central guiding and supporting pin for a stack of records, having a plurality of elongated slots, a first elongated control member having an end extending beyond one end of said guide pin and being mounted for reciprocation inside said guide pin, a plurality of primary supporting prongs, each having a body portion provided with a top end and an outwardly facing included cam surface, means operatively connecting said prongs with said first control member and being operable to hold said prongs in position operable to support a stack of records on the top ends of said prongs and in response to reciprocation of said first control member to displace said prongs to render said prong cam surfaces effective to retract said prongs to allow a record to descend along the guide pin, a second interior elongated reciprocable control member mounted for reciprocation in said guide pin and having an end extending beyond one end of said guide pin, secondary supporting means for temporarily holding the next to the lowest record of a stack supported on said outwardly facing prong ends, means operatively connecting said second control member with said secondary supporting means to render said secondary supporting means effective and ineffective in response to reciprocation of said interior control member in opposite directions, a first pin-shaped actuator member disposed adjacent said extending end of said first control member and extending transversely thereto, means operatively connecting said first actuator member with said first control member and operable to reciprocate said control member in response to translatory displacement of said actuator member, a second pin-shaped actuator member disposed adjacent said extending end of said second control member, means operatively connecting said second actuator member with said second control member operable to reciprocate said second control member in response to a translatory displacement of said second actuator member, a relatively stationary structure having portions extending laterally of said extending ends of said first and said second control members, means including slots in said structure portions operable to receive said pin-shaped actuator members as well as to guide said actuator members for translatory displacement to effectively reciprocate said control members, means in said structure operable to prevent displacement of said first actuator member, and means operable in response to change cycle of said phonograph to control said translatory displacement of said first and said second actuator members to alternately render said prongs and said secondary supporting means effective, including means operable to render said displacement preventing means ineffective.

16. In a phonograph record changer having a change cycle control means: a vertical hollow central guiding and supporting pin for a stack of records, having a plurality of elongated slots, a first elongated control member having an end extending beyond one end of said guide pin and being mounted for reciprocation inside said guide pin, a plurality of primary supporting prongs, each having a body portion provided with a top end and an outwardly facing inclined cam surface, means operatively connecting said prongs with said first control member and being operable to hold said prongs in position operable to support a stack of records on the top ends of said prongs and in response to reciprocation of said first control member to displace said prongs to render said prong cam surfaces effective to retract said prongs to allow a record to descend along the guide pin, a second interior elongated reciprocable control member mounted for reciprocation in said guide pin and having an end extending beyond one end of said guide pin, secondary supporting means for temporarily holding the next to the lowest record of a stack supported on said outwardly facing prong ends, means operatively connecting said second control member with said secondary supporting means to render said secondary supporting means effective and ineffective in response to reciprocation of said interior control member in opposite directions, a first pin-shaped actuator member disposed adjacent said extending end of said first control member and extending transversely thereto, means operatively connecting said first actuator member with said first control member and operable to reciprocate said control member in response to translatory displacement of said actuator member, a second pin-shaped actuator member disposed adjacent said extending end of said second control member, means operatively connecting said second actuator member with said second control member operable to reciprocate said second control member in response to a translatory displacement of said second actuator member, a relatively stationary structure having portions extending laterally of said extending ends of said first and said second control members, means including slots in said structure portions operable to receive said pin-shaped actuator members as well as to guide said actuator members for translatory displacement to effectively reciprocate said control members, lock means in said structure operable to render said first actuator member inoperable to reciprocate said first control member, and means operable in response to change cycle of said phonograph to control said translatory displacement of said first and said second actuator members to alternately render said prongs and said secondary supporting means effective, as well as to render said lock means ineffective.

17. In a phonograph record changer having a change cycle control means: a vertical hollow central guiding and supporting pin for a stack of records, having a plurality of elongated slots, a first elongated control member having an end extending beyond one end of said guide pin and being mounted for reciprocation inside said guide pin, a plurality of primary supporting prongs, each having a body portion provided with a top end and an outwardly facing inclined cam surface, means operatively connecting said prongs with said first control member and being operable to hold said prongs in position operable to support a stack of records on the top ends of said prongs and in response to reciprocation of said first control member to displace said prongs to render said prong cam surfaces effective to retract said prongs to allow a record to descend along the guide pin, a second interior elongated reciprocable control member mounted for reciprocation in said guide pin and having an end extending beyond one end of said guide pin, secondary supporting means for temporarily holding the next to the lowest record of a stack supported on said outwardly facing prong ends, means operatively connecting said second control member with said secondary supporting means to render said secondary supporting means effective and ineffective in response to reciprocation of said interior control member in opposite directions, a first pin-shaped actuator member disposed adjacent said extending end of said first control member and extending transversely thereto, means operatively connecting said first actuator member with said first control member and operable to reciprocate said control member in response to translatory displacement of said actuator member, a second pin-shaped actuator member disposed adjacent said extending end of said second control member, means operatively connecting said second actuator member with said second control member operable to reciprocate said second control member in response to a translatory displacement of said second actuator member, a relatively stationary structure having portions extending laterally of said extending ends of said first and said second control members, means including slots in said structure portions operable to receive said pin-shaped actuator members as well as to guide said actuator members for translatory displacement to effectively reciprocate said control members, and control means operable in response to change cycle of said phonograph including first cam means operable to control said translatory displacement of said first actuator member and second cam means operable to control said translatory movement of said second actuator member to alternately render said prongs and said secondary supporting means effective.

18. In a phonograph record changer having a change cycle control means: a vertical hollow central guiding and supporting pin for a stack of records, having a plurality of elongated slots, a first elongated control member having an end extending beyond one end of said guide pin and being mounted for reciprocation inside said guide pin, a plurality of primary supporting prongs each having a body portion provided with a top end and an outwardly facing inclined cam surface, means operatively connecting said prongs with said first control member and being operable to hold said prongs in position operable to support a stack of records on the top ends of said prongs and in response to reciprocation of said first control member to displace said prongs to render said prong cam surfaces effective to retract said prongs to allow a record to descend along the guide pin, a second interior elongated reciprocable control member mounted for reciprocation in said guide pin and having an end extending beyond one end of said guide pin, secondary supporting means for temporarily holding the next to the lowest record of a stack supported on said outwardly facing ends of said prongs, means operatively connecting said second control member with said secondary supporting means to render said secondary supporting means effective and ineffective in response to reciprocation of said interior control member in opposite directions, a first pin-shaped actuator member disposed adjacent said extending end of said first control member and extending transversely thereto, means operatively connecting said first actuator member with said first control member and operable to reciprocate said control member in response to translatory displacement of said actuator member, a second pin-shaped actuator member disposed adjacent said extending end of said second control member, means operatively connecting said second actuator member with said second control member operable to reciprocate said second control member in response to a translatory displacement of said second actuator member, a relatively stationary structure having portions extending laterally of said extending ends of said first and said second control members, means including slots in said structure portions operable to receive said pin-shaped actuator members as well as to guide said actuator members for translatory displacement to effectively reciprocate said control members, and control means operable in response to change cycle of said phonograph including a structure mounted for movement relatively to said stationary structure and having first slots intersecting said slots of said stationary structure and operable to guide said first actuator member in response to relative movement between said structures, said movable structure having second slots intersecting said slots of said stationary structure and operable to guide said second actuator member in said slots of said stationary structure in response to relative movement between said structures, and means operable to move said movable structure relatively to said stationary structure.

19. In a phonograph record changer having means operable to control a change cycle, a vertical hollow central guiding and supporting pin for a stack of records, having a plurality of elongated slots, a first elongated control member having an end extending beyond one end of said guide pin and being mounted for reciprocation inside said guide pin, a plurality of primary supporting prongs, each having a body portion provided with a top end and an outwardly facing inclined cam surface, means operatively connecting said prongs with said first control member and being operable to hold said prongs in position operable to support a stack of records on the top ends of said prongs and in response to reciprocation of said first control member to displace said prongs to render said prong cam surfaces effective to retract said prongs to allow a record to descend along the guide pin, a second elongated reciprocable control member mounted for reciprocation within said guide pin, secondary supporting means for temporarily holding the next to the lowest record of a stack supported on said outwardly facing prong ends, means operatively connecting said interior elongated control member with said secondary supporting means to render said secondary supporting means effective and ineffective in response to reciprocation of said second control member in opposite directions, cycle responsive means operable to control the reciprocation of said tubular control member as well as said second reciprocable control member in timed relationship to render said prongs and said secondary supporting means effective and ineffective in opposite timed relationship, means operable to render said change cycle control means ineffective, and means operable in response to the actuation of said last mentioned means to render only said first control member effective to retract said prongs to within said guide pin.

20. In a phonograph record changer having a change cycle control means: a vertical hollow central guiding and supporting pin for a stack of records, having a plurality of elongated slots, a first elongated control member having an end extending beyond one end of said guide pin and being mounted for reciprocation inside said guide pin, a plurality of primary supporting prongs, each having a body portion provided with a top end and an outwardly facing inclined cam surface, means operatively connecting said prongs with said first control member and being operable to hold said prongs in position operable to support a stack of records on the top ends of said prongs and in response to reciprocation of said first control member to displace said prongs to render said prong cam surfaces effective to retract said prongs to allow a record to descend along the guide pin, a second interior elongated reciprocable control member mounted for reciprocation in said guide pin and having an end extending beyond one end of said guide pin, secondary supporting means for temporarily holding the next to the lowest record of a stack supported on said outwardly facing prong ends, means operatively connecting said second control member with said secondary supporting means to render said secondary supporting means effective and ineffective in response to reciprocation of said interior control member in opposite directions, a first pin-shaped actuator member disposed adjacent said extending end of said first control member and extending transversely thereto, means operatively connecting said first actuator member with said first control member and operable to reciprocate said control member in response to translatory displacement of said actuator member, a second pin-shaped actuator member disposed adjacent said extending end of said second control member, means operatively connecting said second actuator member with said second control member operable to reciprocate said second control member in response to a translatory displacement of said second actuator member, a relatively stationary structure having portions extending laterally of said extending ends of said first and said second control members, means including slots in said structure portions operable to receive said pin-shaped actuator members as well as to guide said actuator members for translatory displacement to effectively reciprocate said control members, and a structure having portions extending laterally in substantially parallel relationship to the portions of said relatively stationary structure, means supporting said structure for pivotable movement on said relatively stationary structure, first slots in said pivotable structure extending transversely to the slots of said relatively stationary structure and operable to receive said first pin-shaped actuator member at the points of intersection between the slots of said pivotable structure and said relatively stationary structure as well as to displace said first pin-shaped actuator member in the slots of said relatively stationary structure in response to pivoting of said pivotable structure, second slots in said pivotable structure intersecting the slots of said relatively stationary structure and being operable to receive said second pin-shaped actuator member of said points of intersection as well as to displace said second pin-shaped actuator member in the slots of said relatively stationary structure in response to pivoting of said pivotable structure and means for pivoting said pivotable structure in response to change cycle to alternately render said prongs and said secondary supporting means effective and ineffective.

21. In a phonograph record changer having means operable to control a change cycle, a vertical hollow central guiding and supporting pin for a stack of records having a plurality of elongated slots, a first elongated control member having an end extending beyond one end of said guide pin and being mounted for reciprocation inside said guide pin, a plurality of primary supporting prongs, each having a body portion provided with a top end and an outwardly facing inclined cam surface, means operatively connecting said prongs with said first control member and being operable to hold said prongs in position operable to support a stack of records on the top ends of said prongs and in response to reciprocation of said first control member to displace said prongs to render said prong cam surfaces effective to retract said prongs to allow a record to descend along the guide pin, a second elongated reciprocable control member mounted for reciprocation within said guide pin, secondary supporting means for temporarily holding the next to the lowest record of a stack supported on said outwardly facing prong ends, means operatively connecting said interior elongated control member with said secondary supporting means to render said secondary supporting means effective and ineffective in response to reciprocation of said second control member in opposite directions, cycle responsive means operable to control the reciprocation of said tubular member as well as said second reciprocable control member in timed relationship to render said prongs and said secondary supporting means effective and ineffective in opposite timed relationship, means operable to render said change cycle control means ineffective, and means including first cam means operable to control reciprocation of said first control member only, and second cam means operable to control reciprocation of said second control member only, as well as means included in said cam means operable to render only said first control member effective to retract said prongs.

22. In a record-changing phonograph having a center spindle of the umbrella type with primary supporting members in the form of a plurality of tiltable prongs, secondary supporting means and actuator means operable to render said secondary supporting means effective to support the next-lowest record of the stack of records supported on said prongs and thereafter render said prongs ineffective to enable the release of the lowest record of said stack, in combination:

first actuator means in said spindle operatively connected with said prongs only and operable to render said prongs effective and ineffective in response to reciprocation thereof, second actuator means operatively connected with said secondary supporting means and operable to render said secondary supporting means effective and ineffective in response to reciprocation thereof, cycle control means for actuating said first actuator means and said second actuator means independently of one another including means operable to render said cycle control means ineffective during the playing of a record and further actuator means operable to render said cycle control means effective between playing of records, and means operatively connecting said cycle control means with said first actuator means of said center spindle to lock said first actuator means independently of said second actuator means against reciprocation when said cycle control means is ineffective and to disable the locking effect and thereafter control the reciprocation of said first actuator means when said control means is rendered effective.

23. In a record-changing phonograph having an umbrella-type center spindle with primary supporting members in the form of a plurality of tiltable prongs, secondary supporting means and actuator means operable to render said secondary supporting means effective to support the next-lowest record of the stack of records supported on said prongs and thereafter render said prongs ineffective to enable release of the lowest record of said stack, and a cycle control mechanism which is only operable between playing of records and is operatively connected with said prongs and said secondary supporting means of the center spindle to control the release of the lowest record of the stack supported on said prongs by first rendering the secondary supporting means effective to hold the next-lowest record of the stack and thereafter to retract the prongs to release the lowest record, the improvement essentially consisting of first and second independent control means for said prongs and said secondary supporting means, respectively, to actuate said prongs and said secondary supporting means independently of one another, first and second connecting means operatively connecting said cycle control mechanism with said first and second independent control means, respectively, and the first connecting means operatively connecting said control mechanism with said first independent control means for the prongs being provided with means for preventing displacement of said first control means during playing of a record and, upon actuating of said control mechanism after playing of a record, first to render said preventing means ineffective and thereafter positively control the displacement of the prongs.

References Cited by the Examiner

FOREIGN PATENTS

| | | | |
|---|---|---|---|
| 2,615,720 | 10/1952 | Miller et al. | 274—10 |
| 3,023,008 | 2/1962 | Ansar | 274—10 |
| 3,083,022 | 3/1963 | Hansen | 274—10 |
| 3,128,101 | 4/1964 | Benwill | 274—10 |

FOREIGN PATENTS

| | | |
|---|---|---|
| 794,293 | 4/1958 | Great Britain. |

NORTON ANSHER, *Primary Examiner.*

H. S. WILLIAMS, W. E. JACKSON, *Assistant Examiners.*